(12) United States Patent
Hayashi

(10) Patent No.: US 6,862,114 B1
(45) Date of Patent: Mar. 1, 2005

(54) IMAGE DATA TRANSMITTING APPARATUS AND IMAGE DATA RECEIVING APPARATUS

(75) Inventor: Motohiro Hayashi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/491,643

(22) Filed: Jan. 27, 2000

(30) Foreign Application Priority Data

Jan. 28, 1999 (JP) .......................... 11-019397
Oct. 29, 1999 (JP) .......................... 11-308131

(51) Int. Cl.⁷ .............................................. H04N 1/40
(52) U.S. Cl. ...................... 358/437; 358/1.15; 358/404; 358/405; 358/468
(58) Field of Search ............................ 358/437, 1.15, 358/404, 405, 468

(56) References Cited

U.S. PATENT DOCUMENTS

| | | | |
|---|---|---|---|
| 4,887,162 A | * 12/1989 | Arai | 358/400 |
| 5,270,830 A | 12/1993 | Suzuki | 358/400 |
| 5,825,990 A | * 10/1998 | Heo et al. | 358/1.14 |
| 5,839,014 A | * 11/1998 | Takahashi et al. | 399/21 |
| 5,896,204 A | * 4/1999 | Sato et al. | 358/405 |
| 6,377,357 B1 | * 4/2002 | Sato et al. | 358/1.15 |
| 6,512,599 B1 | * 1/2003 | Hattori | 358/442 |

FOREIGN PATENT DOCUMENTS

| | | |
|---|---|---|
| CN | 1161478 A | 10/1997 |
| JP | 4-255159 | 9/1992 |
| JP | 5-145725 | 6/1993 |
| JP | 7-115528 | 5/1995 |

OTHER PUBLICATIONS

Chinese Patent Office First Office Action dated Jun. 6, 2003 (5 pp.) for corresponding application No. 00106505.X.

* cited by examiner

Primary Examiner—Madeleine Nguyen
Assistant Examiner—Negussie Worku
(74) Attorney, Agent, or Firm—Edwards & Angell, LLP; David G. Conlin; George W. Hartnell, III

(57) ABSTRACT

The invention provides an image data transmitting apparatus and functions which eliminate needs of troublesome handling of documents without reducing utilization efficiency of the apparatus in retransmitting document data. The image data transmitting apparatus comprises a document reading portion; an image memory; a communication portion; and a main CPU, in such a configuration that when a transmission trouble is detected, the apparatus stops both reading operation of documents and transmission operation of image data and, when the documents are reset thereafter, resumes both of the reading and transmission operations, in which the apparatus stores both the number of document sheets for which image data has been transmitted by a time when transmission is stopped due to a transmission trouble and the number of documents for which image data has already been stored. In retransmitting all the documents, the apparatus provides discrimination data for discriminating between documents for which image data is not transmitted and documents for which image data is already transmitted, based on the stored number of transmitted sheets.

6 Claims, 16 Drawing Sheets

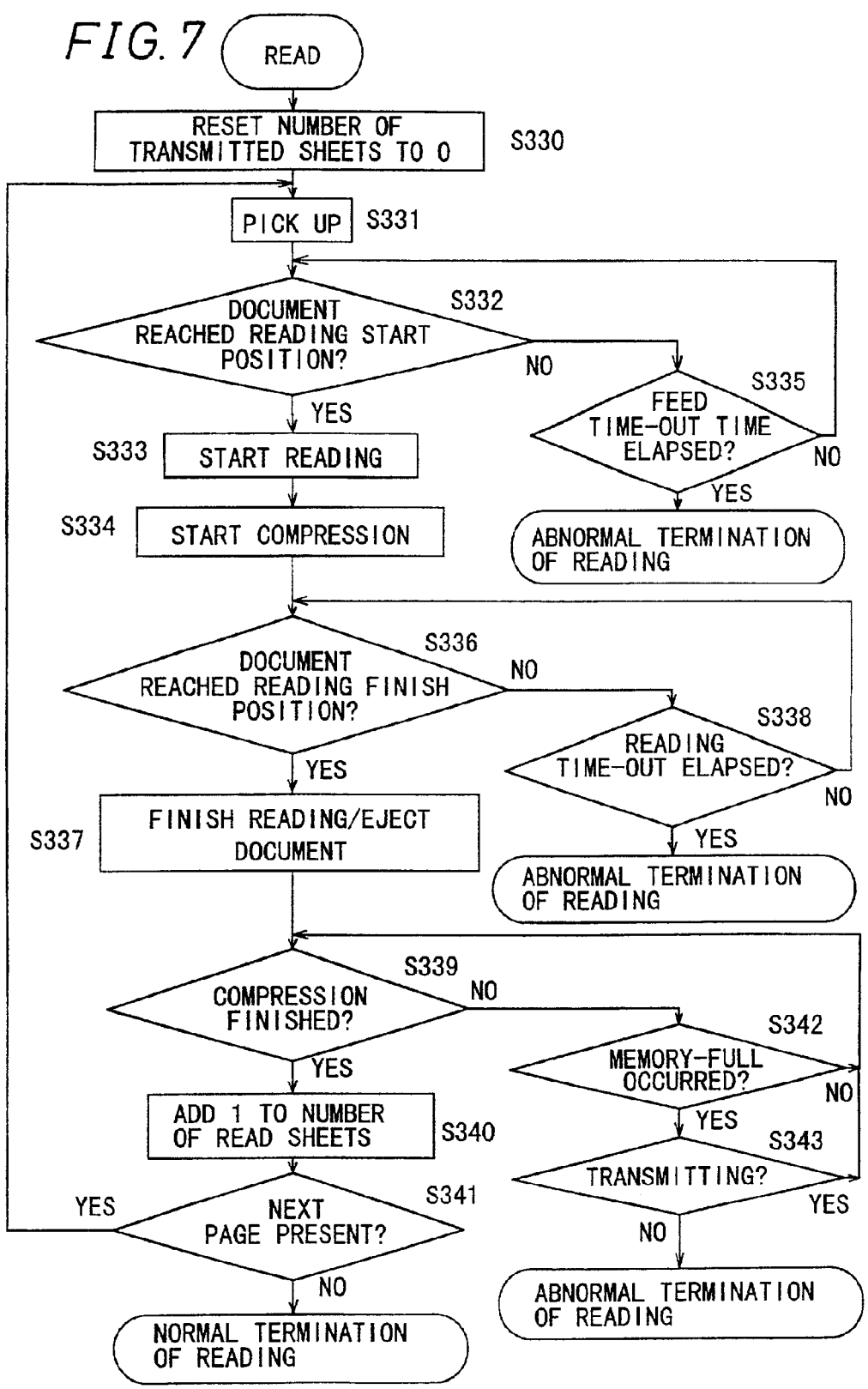

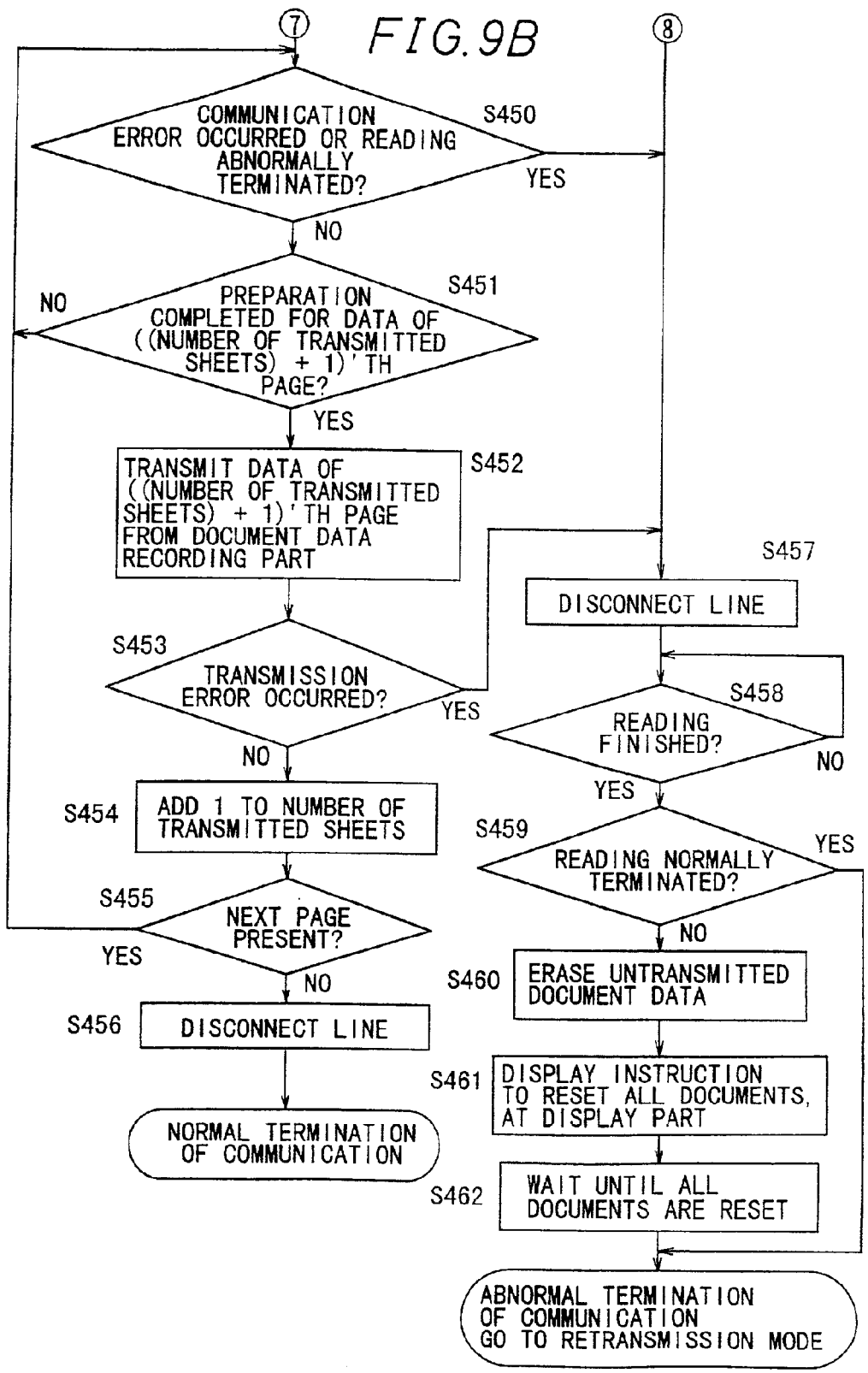

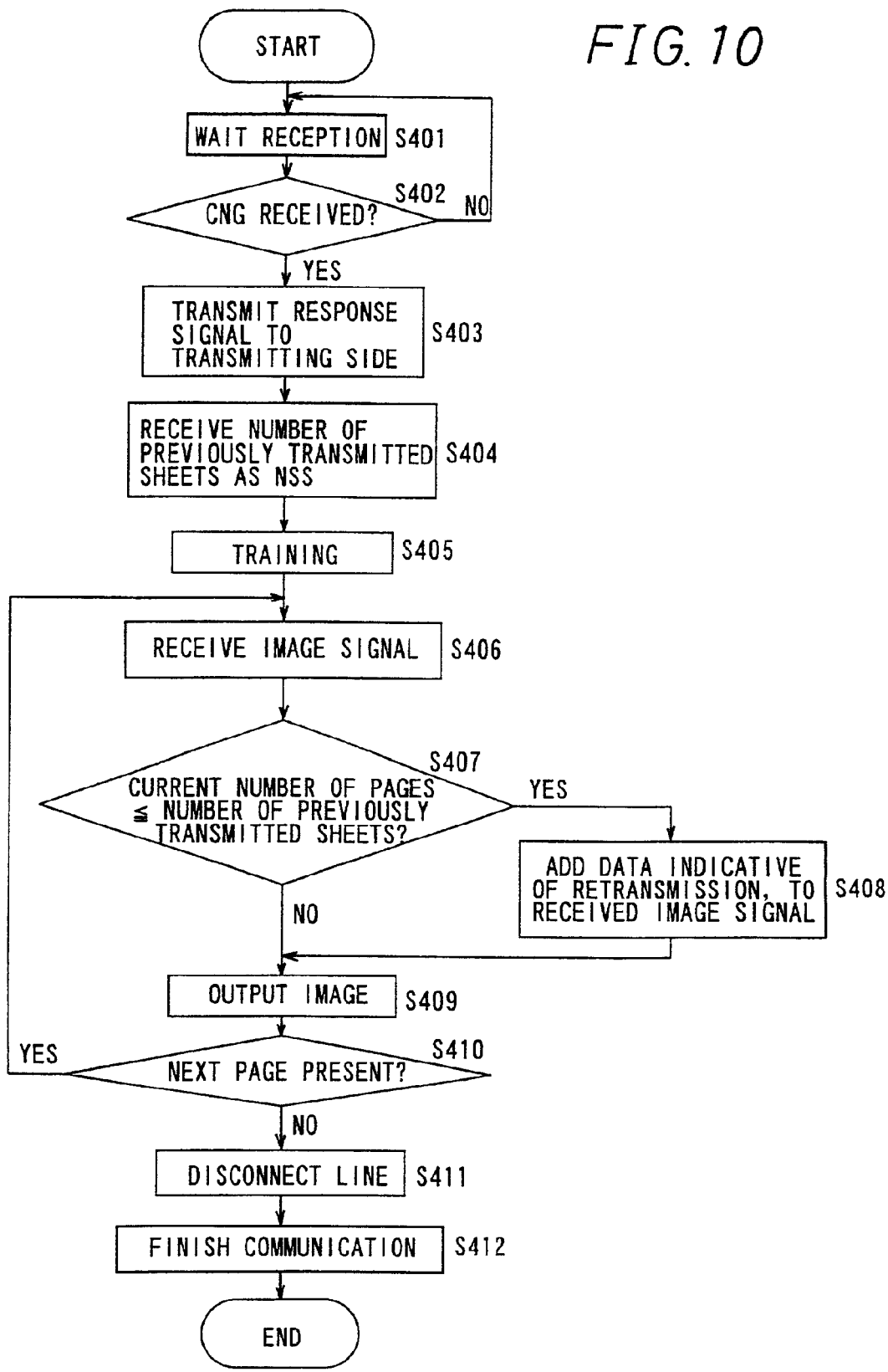

IMAGE DATA TRANSMITTING APPARATUS AND IMAGE DATA RECEIVING APPARATUS

BACKGROUND OF THE INVENTION

1. Field of the Invention

The present invention relates to an image data transmitting apparatus represented by a facsimile apparatus and a printer or digital copying machine provided with an image data transmission/reception function represented by a facsimile function, and more particularly to an image data transmission/reception apparatus capable of retransmitting image data or an apparatus provided with an image data transmission/reception function, after.

2. Description of the Related Art

Conventionally, in an image data transmission/reception apparatus represented by a facsimile apparatus (hereinafter generically called as facsimile apparatus) or an apparatus having an image data transmission/reception function represented by a facsimile function (hereinafter generically called as facsimile function), when an image transmission error occurs during data transmission of documents, the user has to find from which page the transmission should be started again and to set the pages on and after that transmission error page to be retransmitted, thus being involved in difficult and troublesome handling of the documents.

In order to solve this problem, a technology is given in Japanese Unexamined Patent Publication JP-A 7-115528 (1995). That is, according to that publication, a facsimile apparatus comprises automatic document feeding means; reading means; an image memory; transmission means; transmission-error detection means; and an error-page memory, wherein when a transmission error is detected by the transmission-error detection means, a number of a page involved in that transmission error is stored in the error page number memory, then transmission is stopped, pages which are set on the automatic document feeding apparatus, which precede the transmission error page, are fed without being read, and reading of pages on and after the transmission error page is started again.

Thus, according to that technology of the publication, in handling of documents, the user himself need not find a transmission error page but needs only to set all the pages in order to transmit not-transmitted pages appropriately. Also, the publication discloses that since the number of the transmission error page is detected by a page counter, the number of the transmission error page may be displayed at a display part.

There is also known such a transmission method (hereinafter called as memory transmission) for a certain type facsimile apparatus that beforehand stores a plurality of pages of data in such a mass-capacity storage means as a hard disk, so as to start transmission at regular time intervals or when the communication line is not busy.

Therefore, even when the technology given in the publication is combined with a memory-transmission-capable facsimile apparatus or a certain type facsimile apparatus which saves a page of image data in a memory until the page is completely sent, in order to make handling of documents at the occurrence of a trouble easy, it is still necessary to read pages on and after the transmission error page again despite the fact that the pages on and after the transmission error page of document data are stored in the memory already.

This may result in that image data of pages on and after the transmission error page are erased or stored separately. In the former case, data which are read previously must be read again, thus prolonging a time required for retransmitting that data from a facsimile apparatus. In the latter case, there exists a plurality of the same document data in a memory, thus leading to such a problem as troublesome page management for transmission or increases in a memory capacity required.

Moreover, the problem has an influence not only on the transmitter side but also on the receiver side, in such a way that when a trouble occurred on the side of the transmitter and a plurality of times of transmission is necessary, the same data are stored in a memory, thus leading to such various problems that the receiver side would output the same image data or that troublesome work is required to select desired items of the output.

A facsimile apparatus disclosed in Japanese Unexamined Patent Publication JP-A 4-255159 (1992) subtracts, in transmission, a number of pages outputted already from a number of pages of the total image data to be transmitted to obtain a number of pages yet to be sent and display the numbers of the pages thus obtained. JP-A 4-255159, in which data retransmission of documents is not taken into account, does not disclose any method for utilizing the number of pages whose data are not transmitted yet, in retransmission.

Further the facsimile apparatus disclosed therein stores the number of a reception error page, for example, a page whose data are not yet transmitted, in reading and transmission of data of documents, and displays the thus stored page number. Still another facsimile apparatus disclosed in Japanese Unexamined Patent Publication JP-A 5-145725 (1993) marks a document itself whose data is not yet transmitted so as to read and transmit again only thus marked documents in a data retransmission operation. JP-A 5-145725 does not disclose any method for utilizing the number of transmission error pages. In the facsimile apparatus of JP-A 5-145725 a mark indicative of transmission error is directly placed on a document, so that it is necessary to read data of error pages in retransmission. Therefore, it is difficult to apply the technology disclosed in JP-A 5-145725 to retransmission of data of documents by a facsimile apparatus of a memory transmission type.

SUMMARY OF THE INVENTION

From the viewpoint of the above, it is an object of the invention to provide an image data transmitting apparatus and an image data receiving apparatus capable of making easier troublesome handling of printed output results by enabling discriminating between image data received and image data not yet received, in transmission of multiple-document image data after an occurrence of transmission trouble.

The invention provides an image data transmitting apparatus comprising document reading means for reading a document set therein; image data storing means for storing the image data of the document resulting from reading; communication means connected to an image data receiving apparatus via a communication line; and trouble detecting means for detecting a transmission trouble which has occurred in transmitting the image data by the communication means, wherein when the trouble detecting means detects the transmission trouble, a reading operation of the document reading means and a transmission operation of the communication means are stopped, and when the documents are set in the document reading means thereafter again, the reading operation of the document reading means and the transmission operation of the communication means are restarted, the image data transmitting apparatus further comprising transmitted-sheets-number storing means for storing a number of document sheets for which image data is completely transmitted by the communication means by a time when the interruption of transmission is carried out by reason of occurrence of the transmission trouble, wherein in retransmitting image data for all the documents, discrimination data is added to the image data for the documents to discriminate between image data which is already transmitted and image data which is not transmitted yet, based on the data stored in the transmitted-sheets-number storing means.

According to the invention the image data transmitting apparatus has a function of adding discrimination data to discriminate between image data of which transmission is incomplete and image data of which transmission is completed, based on data stored in the transmitted-sheets-number storing means. With this constitution, even when image data of which transmission is already completed is retransmitted, it is possible to smoothly and simply discriminate image data based on discrimination data on a reception side, thus eliminating a need for the reception side to be engaged in troublesome work of sorting received documents into already received documents and newly received documents.

In the invention it is preferable that the image data transmitting apparatus further comprises read-sheets-number storing means for storing a number of document sheets for which image data resulting from reading by the document reading means is stored in the image data storing means; and notification means for notifying a user of a number of document sheets to be reset in the document reading means for retransmission, based on the data stored in the transmitted-sheets-number storing means or the read-sheets-number storing means, wherein for the documents reset in the document reading means reading is carried out again and resulting image data is retransmitted.

According to the invention the image data transmitting apparatus comprises the notification means, thus making it possible to avoid lack or excess of documents to be transmitted for simple and secured retransmission. That apparatus can also eliminate a process of ejecting excess documents without reading them, thus reducing the document reading time to a minimum to shorten the time involved in setting to releasing documents.

In the invention it is preferable that in retransmission of the documents reset in the document reading means after the interruption of the transmission operation because of a transmission trouble, image data which is read for predetermined part of each of the reset documents by the document reading means is compared to image data for corresponding part of each document previously read and stored in the image data storing means, and when the image data matches, reading of an entirety of the relevant reset document is not carried out and when the image data does not match, reading for the entirety of the relevant reset document is carried out.

According to the invention, in connection with retransmission, the user of the image data transmitting apparatus need not take the resetting order of documents into account. Regardless of the resetting order of documents, only necessary documents can be retransmitted, thus avoiding a loss in time produced by reading again documents which are already read.

The invention provides an image data receiving apparatus comprising communication means connected an image data transmitting apparatus via a communication line; image data storing means for storing image data of transmission data received via the communication line; controlling/printing means for controlling and printing image data stored in the image data storing means; and discrimination-data detecting means for detecting discrimination-data for discriminating between image data previously not transmitted and image data previously transmitted has been transmitted from the image data transmitting apparatus, wherein the controlling/printing means controls printing operation of image data previously not transmitted and printing operation of image data previously transmitted, based on a result of detection by the discrimination-data detection means, to be different from each other.

According to the invention, based on the result of detection by the discrimination-data detection means, the printing operation of image data previously not transmitted and that of image data previously transmitted can be controlled by the controlling/printing means to be different from each other. Accordingly, it is possible to prevent image data determined on the transmission side from being added to image data of a document to be transmitted, and provide an arbitrary message at an arbitrary position of image data of a document on the reception side. Moreover, the reception side can easily decide whether image data in question is already transmitted or not, thus improving the flexibility.

In the invention it is preferable that the printing operation of the image data previously transmitted is different from that of image data previously not transmitted, in that an image to an effect that transmission has already been completed is printed in printing the image data previously transmitted.

According to the invention, the printing operations are made different by printing an image to the effect that transmission has already been completed, in printing the image data previously transmitted, and no image data determined on the transmission side is added to image data of documents, so that an arbitrary message can be provided at an arbitrary position of the document image data on the reception side, thus enabling the reception side to easily recognize whether image data in question is previously transmitted.

In the invention it is preferable that the printing operation of the image data previously transmitted is different from that of image data previously not transmitted, in that when image data previously transmitted is received, image data which corresponds to the received image data and is previously received and stored in the image data storing means, is selectively erased.

According to the invention, since when previously transmitted image data is received, received image data which is already stored in the image data storing means is selectively erased, it is possible to output retransmission image data onto recording paper as demanded from the reception-side user, thus outputting retransmitted image data only as required to save recording paper.

BRIEF DESCRIPTION OF THE DRAWINGS

Other and further objects, features, and advantages of the invention will be more explicit from the following detailed description taken with reference to the drawings wherein:

FIG. 7 is a flowchart relating to a third fax transmission process of the invention;

FIGS. 9A and 9B are a flowchart relating to a fourth fax transmission process of the invention;

FIG. 10 is another flowchart relating to the first fax transmission process of the invention.

DETAILED DESCRIPTION OF THE PREFERRED EMBODIMENT

Figure 1:
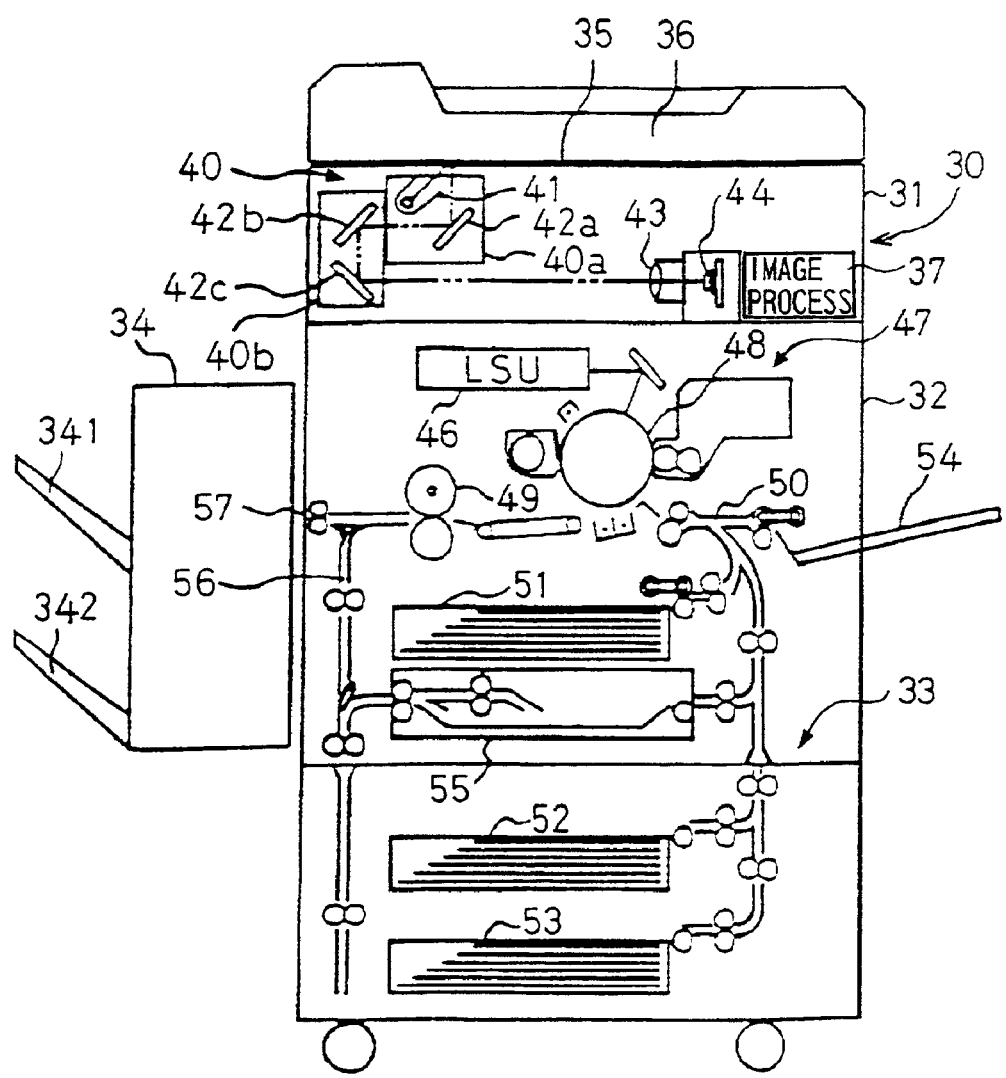
FIG. 1 is a cross-sectional view of a mechanical configuration as a whole of a digital image forming apparatus relating to an embodiment of the invention.

Now referring to the drawings, preferred embodiments of the invention are described below.

The following will describe an embodiment in a case where the invention has been applied to a digital image forming apparatus (digital composite machine) provided with digital copying functions, printer functions, and facsimile functions.

FIG. 1 shows a cross-sectional view of the mechanical overall configuration of a digital image forming apparatus 30. As shown in FIG. 1, the digital image forming apparatus 30 roughly comprises: a scanner part 31; a laser recording part 32; a paper supply/conveyance part 33; a post-processing device 34; and an image processing device 37.

The scanner part 31 comprises: a document mounting table 35 made of transparent glass; a both-surface corresponding automatic document feeding device (RADF) 36 for automatically supplying and conveying documents onto the document mounting table 35; and a document-image reading unit, i.e. scanner unit 40, for scanning and reading in images of a document mounted on the document mounting table 35.

Manuscript images read by the scanner part 31 are sent as image data to the later-described image processing part 37, which performs predetermined image processing on the image data.

The paper supply/conveyance part 33 has a housing which includes: a first cassette 51; a second cassette 52; a third cassette 53; and a manual-insertion multi-tray 54, and it also includes a both-surface unit 55 for recording images on a back surface of a sheet of paper on which images sent from the housing are recorded.

Each cassette of the paper supply/conveyance part 33 contains therein a bundle of forms of the corresponding size, so that when the operator selects any one of these cassettes that contains his desired size of forms, the forms are separated and supplied one by one from the cassette and then conveyed sequentially via a conveyance path 50 in the paper supply/conveyance part 33 to an electric-photograph processing unit in the laser recording part 32.

The RADF-36 acts beforehand to set a plurality of sheets of documents at a time on a predetermined document tray and then supply thus set documents one by one sheet by another onto the document mounting table 35 of the scanner unit 40.

Also, the RADF-36 comprises: a conveyance path used for single-surface documents; a conveyance path used for both-surface documents; and conveyance-path switching means, in order to permit the scanner unit 40 to read single surfaces or both surfaces of a document in response to an operator's selection. Further description of the RADF 36 is omitted here because the RADF 36 has conventionally been applied and put to commercial applications in many cases.

The scanner unit 40 comprises: a lamp-reflector assembly 41 for exposing a document surface; a first scanning unit 40a consisting of a first reflecting mirror 42a for guiding an image of a reflected light from a document to a photo-electric conversion element (CCD) 44; a second scanning unit 40b consisting of second and third reflecting mirrors 42b and 42c for guiding a further reflected light image from the document to the photo-electric conversion element 44; an optical lens 43 for forming an image on the photo-electric conversion element (CCD) 44 for converting a reflected light image from the document into an electric image signal; and a photo-electric conversion element 44 for converting a reflected light image from the document into an electric image signal.

The scanner part 31 is so configured that uses interlocked operations of the RADF 36 and the scanner unit 40 to sequentially mount documents to be read onto the document mounting table 35, while moving the scanner unit 40 along the lower surface of the document mounting table 35, in order to read the document images.

Image data obtained by thus reading in the document images by the scanner 40 is sent to the later-described image processing part 37. After undergoing various processes there, the image data is given to a laser reading unit 46 of the laser recording part 32, to be reproduced as a visible image on a photosensitive drum 48 in an electro-photographing process. Thus reproduced visible image is transferred onto a sheet of paper and formed thereon.

The laser recording part 32 comprises a laser reading unit (LSU) 46 and an electro-photographing process part 47. The laser reading unit 46 comprises: a semiconductor laser for emitting a laser beam corresponding to the image data; a polygonal mirror for deflecting a laser light into equivalent angular velocities; and an f-θ lens for correcting thus equivalent-velocity deflected laser beam so that the beam may be deflected at an equivalent velocity on the photosensitive drum 48 of the electro-photographing process part 47.

The electro-photographing process part 47 has such a configuration that, according to a known embodiment, there are arranged about the photosensitive drum 48 a charger, a developer, a transfer device, a delaminating device, a cleaner, a discharger, and a fixing device 49.

On the downstream side of the fixing device 49 in a direction of conveying a sheet of paper for forming an image thereon is provided a sheet of paper conveyance path for ejecting, which branches to a conveyance path 57 leading to the post-processing device 34 and a conveyance part 56 leading to the both-surface unit 55.

Image data are formed as an electrostatic latent image on a surface of the photosensitive drum 48 when the laser reading unit 46 scans a laser beam, which latent image is then transformed into a visible image with toner, which resultant toner image is then fixed by electrostatic transfer on a surface of a sheet of paper conveyed from the paper supply/conveyance part (multi-stage paper supply unit) 33. Then, the sheet of paper on which the image is thus formed is selectively conveyed from the fixing device 49 via the conveyance path 57 to the post-processing device 34 or via the conveyance path 56 to the both-surface unit 55.

As shown to the left of FIG. 1, the post-processing device 34 has a first displacing tray 341 and a second displacing tray 342 arranged in parallel vertically, to receive a sheet of paper on which an image is recorded by the digital image forming apparatus 30, from the conveyance path 57.

The post-processing device 34 arranges therein: an inlet for sheets of paper (not shown); a first conveyance path; a second conveyance path; a first switching gate; a second switching gate; a third conveyance path (inversion path); a first displacing roller; and a second displacing roller, which correspond to various displacement modes.

Figure 2:
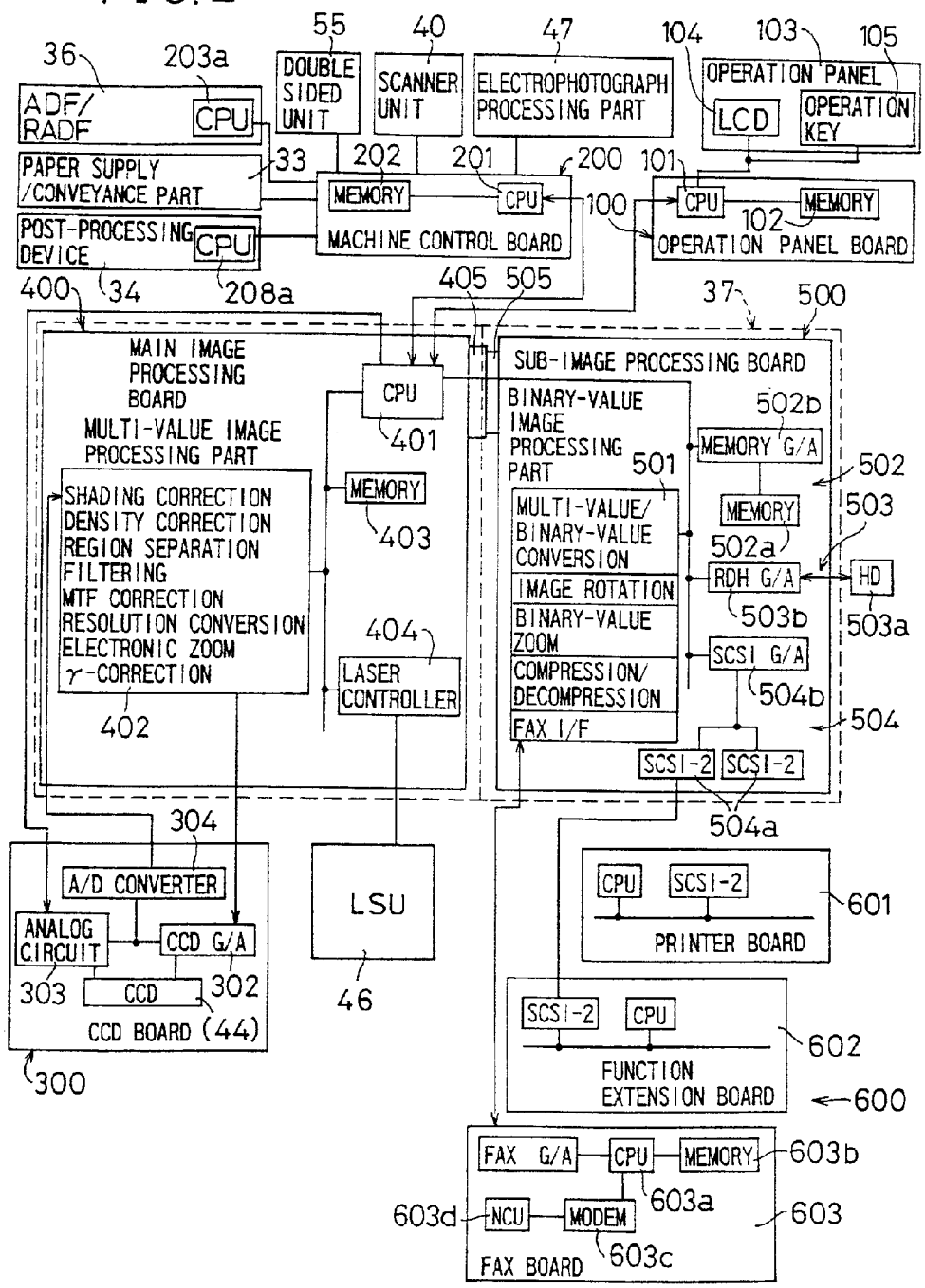
FIG. 2 is a block diagram of an electric circuit configuration of the digital image forming apparatus of FIG. 1.

Next, a configuration and functions of the image processing part 37, in the digital image forming apparatus shown in FIG. 1, for performing image processing on image data which are read are described below. FIG. 2 shows a block diagram of an electrical overall configuration of various units, image processing parts, and other components of the digital image forming apparatus 30, indicating such a situation that a main central processing unit (CPU) 401 positioned at the enter of FIG. 1 is interlocked with sub-central processing units (CPUs) 101, 201, etc. installed for each unit, to manage the operations.

The digital image forming apparatus 30 comprises: an operation panel board 100 positioned to the right top in FIG. 2 for managing and controlling an operation panel; a machine-control board 200 positioned to the left top in FIG. 2 for managing and controlling various units constituting the digital image forming apparatus 30; a CCD board 300 positioned roughly to the left bottom in FIG. 2 for electrically converting document images into image data; a main image-processing board 400 positioned at roughly the center in FIG. 2 for performing predetermined image processing on document images converted into electronic data at the CCD board 300; a sub-image processing board 500 for further performing predetermined image processing on image data processed by the main image processing board 400; and another extension board group (a printer board 601, a function extension board 602, a FAX board 603, etc.) connected via an interface to the sub-image processing board 500. The following will describe contents for each board which are managed and controlled.

The operation-panel board 100 is basically controlled by the CPU 10i, to manage such operations as display onto a display screen of an LCD display part 104 arranged on the operation panel 103 and inputs for instructions related to various modes made on an operation key pad 105. There is provided a memory 102 for storing various kinds of control data on the operation panel 103 such as data entered on the operation key pad 105 or data displayed on the LSD screen.

In the configuration, the sub-CPU 101 on the operation panel board 100 communicates control data etc. with the main CPU 401, to give instructions to the digital image forming apparatus 30. The main CPU 401, on the other hand, transfers a control signal indicating an operation state of the digital image forming apparatus 30 to the sub-CPU 101, to display the operator an operation state indicating the current state of the apparatus on the LCD screen 104 of the operation panel 103.

The machine control board 200 as a whole is controlled by the sub-CPU 201, to manage: an automatic document feeding device 36 such as ADF and RADF; a scanner unit 40 for reading in document images; an electro-photograph processing part 47 for reproducing image data as an image; a paper supply/conveyance part 33 for sequentially conveying forms with images recorded thereon from the housing to the electro-photograph processing part; a both-surface unit 55 for inverting and conveying a sheet of paper so that a sheet of paper with images recorded thereon may be inverted so as to form images on both surfaces; and a post-processing device 34 for performing post processing such as stabilization on a sheet of paper with images recorded thereon.

The CCD board 300 comprises: a photo-electronic conversion element 34 for electrically reading in document images; a driver circuit (CCD gate array) 302 for driving the photo-electronic conversion element 44; an analog circuit 303 for adjusting a gain of analog data outputted from the photo-electronic conversion element 44; and an A/D converter 304 for converting an analog signal from the photo-electronic conversion element 44 into a digital signal and outputting the digital signal, and is managed and controlled by the main CPU 401.

The main image processing board 400 is controlled by the main CPU 401 and comprises: a multi-value image processing part 402 for performing shading correction, density correction, region separation, filtering, MTF correction, resolution conversion, electronic zooming (magnitude changing processing), y-correction, etc. on multi-value image data as it is, based on electronic data of a document image sent from the CCD board 300; a memory 403 for storing image data processed and various control signals for managing processing procedures, in order to express gradation of an image in a desired state based on electronic data of a document image sent from the CCD board 300; and a laser controller 404 for transferring, and controlling, data to the laser reading unit 46 in order to reproduce images based on the image data processed.

The sub-image processing board 500 is connected with a connector with the main image processing board 400 and comprises: a binary-value image processing part 501 controlled by the main CPU 401 on the main image processing board 400; a first storage part 502 consisting of a memory 502a for storing and managing binary-value data which have undergone image processing or control data used in processing and a gate array 502b for controlling the memory 502b; a second storage part 503 consisting of a hard disk device 503a and a gate array 503b for controlling the hard disk device 503a, for storing and managing a plurality of sheets of document image data to read out repeatedly the plurality of sheets of document images by as much as a desired number of sheets in order to generate a plurality of copies; and an external interface 504 consisting of an SCSI 504a and a gate array 504b for controlling the SCSI.

The binary-value image processing part 501 comprises: a processing part for converting multi-value image data into binary-value image data; a processing part for rotating images; a binary-value magnifying (zoom) processing part for performing magnifying processing on binary-value images; and a fax interface for transmitting and receiving fax images via communication means.

The extension board 600 may come in: the printer board 601 for permitting data sent from a personal computer etc. in the printer mode to be outputted from the laser recording part 32 of the digital image forming apparatus 30; the function extension board 602 for extending an edit function of the digital image forming apparatus 30 to effectively utilize the properties of the digital image forming apparatus 30; or the facsimile board 603 for permitting to transmit a document image read from the scanner part of the digital image forming apparatus to a counterpart and then output image data sent back from the counterpart, from a printer of the digital image forming apparatus.

The following will describe in detail processing of image data by the digital image forming apparatus in the fax mode and a flow of the data.

In the fax mode, for example such processing is performed as transmitting documents to a counterpart and receiving documents from the counterpart. First, processing of transmitting documents to the counterpart is described. A transmission document set at a predetermined position of the RADF 36 of the digital image forming apparatus 30 is sequentially supplied one sheet by another onto the document mounting table 35 of the scanner unit 40. Images of the transmission document are sequentially read by the earlier mentioned configuration of the scanner unit 40, thereby transferring resultant 8-bit electronic data of the image to the main image processing board 400.

The 8-bit electronic data of images thus transferred to the main image processing board 400 undergoes, as 8-bit electronic data, predetermined processing at the multi-value image processing part 402. Then, the 8-bit electronic data of images which has been processed is sent from a connector 405 on the side of the main image processing board 400 via a connector 505 on the side of the sub-image processing board 500 to the sub-image processing board 500, so as to be converted, at the multi-value/binary-value conversion part of the binary-value image processing part 501, from 8-bit electronic data into 2-bit electronic data as the same time as undergoing error diffusion processing.

The reason why, together with error diffusion processing, the 8-bit electronic data of images is converted into 2-bit electronic data is to compensate for deterioration in the picture quality caused by performing only multi-value/binary-value conversion. Thus, a reception document converted into a binary-value image is compressed in a predetermined format and stored in the memory 502*a*.

Next, when a transmission procedure with the counterpart is performed and a transmission-enabled state is established, data of document images to be transmitted which are read out and compressed in the predetermined format from the memory 502*a* are transferred to the side of the fax board 603 and, there, undergo necessary processing and then are transmitted sequentially via the communication line to the counterpart.

Next, processing of the document image data transmitted from the counterpart are described. When the document image data are transmitted via the communication line from the counterpart, the data are received while performing a communication procedure at the fax board 603. Thus received image data as compressed in the predetermined format are given from the fax interface provided to the binary-value image processing part 501 of the sub-image processing board 500 to the binary-value image processing part 501. The binary-value image processing part 501 uses a built-in compression/decompression processing part etc. to reproduce thus transmitted document image data into image data for each page.

Next, the document image data thus reproduced as image data per page is transferred to the side of the main image processing board 400 and undergoes y-correction there. The laser controller 404 controls, based on data of thus corrected image data, reading operation of the images onto the photosensitive drum 48 so as to reproduce the images at the LSU 46.

As can be seen from the description of the configuration, the image processing part 37 for performing predetermined processing on image data mainly comprises: the main image processing board 400 for processing as multiple-value image data the document image data read and input mainly from the scanner part 31; the sub-image processing board 500 for performing predetermined processing such as converting into binary values the document image data processed as multiple-value image data at the main image processing board 400 or then performing predetermined processing on image data sent from equipment connected via the external interface 504 and then transferring the data to the side of the multiple-value image processing part (main image processing board 400).

Also, the main image processing board 400 comprises the laser controller 404 for controlling reading of images at the laser reading unit 46 in order to reproduce images on the photosensitive drum 48 of the electro-photograph processing part 47 by using the laser reading unit 46.

With the configuration, a document image read and input from the scanner part 31 can be reproduced as a multi-value image and copied from the laser recording part 32 without damaging the image properties of the document. A lot of documents can be outputted at a high speed using an electronic RDH function by use of the sub-image processing board 500, the hard disk 503*a*, etc.

The configuration moreover makes it possible to perform appropriate processing on image data matched to digital properties and features provided as those of the digital image forming apparatus 30, such as processing of image data at and outputting of the image data from such an external machine as a fax or printer and, for fax machines alone, converting into binary values the data of transmitted images which has undergone multi-value image processing (i.e., which has properties as a document image).

Also, by dispersing the image processing part, it is possible to provide a variety of variations (line-up) of the digital image forming apparatus 30 to arrange a digital image forming machine so as to meet the user's requirements and also to easily develop a system to meet the user's requirements even after the machine is arranged.

Since in the configuration the CPU 401 arranged on the main image processing board 400 manages and controls the sub-image processing board 500 also, thus managing a flow of the whole processing of images consecutively processed at respective processing parts in a smooth flow without losing image data.

With this, the operations have been described of the scanner part 31 installed to the digital image forming apparatus 30 or the image processing part 37 for processing image data input from the external interface 600.

Processing of transmission and reception including retransmission processing by a fax machine according to the invention is described with reference to flowcharts. Note here that a digital copying machine shown in FIGS. 1 and 2 may either one of the four kinds of fax transmission processes described below. When the fourth fax transmission process is performed, either of the two kinds of fax reception processes may be performed by a counterpart apparatus.

When the user sets a document to the RADF 36 and operates the operation key 105 on the operation panel 103, transmission starts. When a transmission operation is activated, a transmission procedure and a reading procedure are activated one by one and processed independently of each other.

The timing for activation varies with the transmission mode. When a memory transmission mode is selected, the transmission procedure and the reading procedure are activated simultaneously; when an ordinary transmission mode is selected, the reading procedure is activated after a negotiation step of the transmission procedure is finished; and when a consecutive broadcast transmission or time-specified transmission mode is selected, the transmission procedure is activated after the reading procedure is finished. In the following description, in some cases, a flowchart of a single process is divided into a plurality of drawings. Therefore, step numbers are used in place of drawing numbers in the description.

Figure 3:
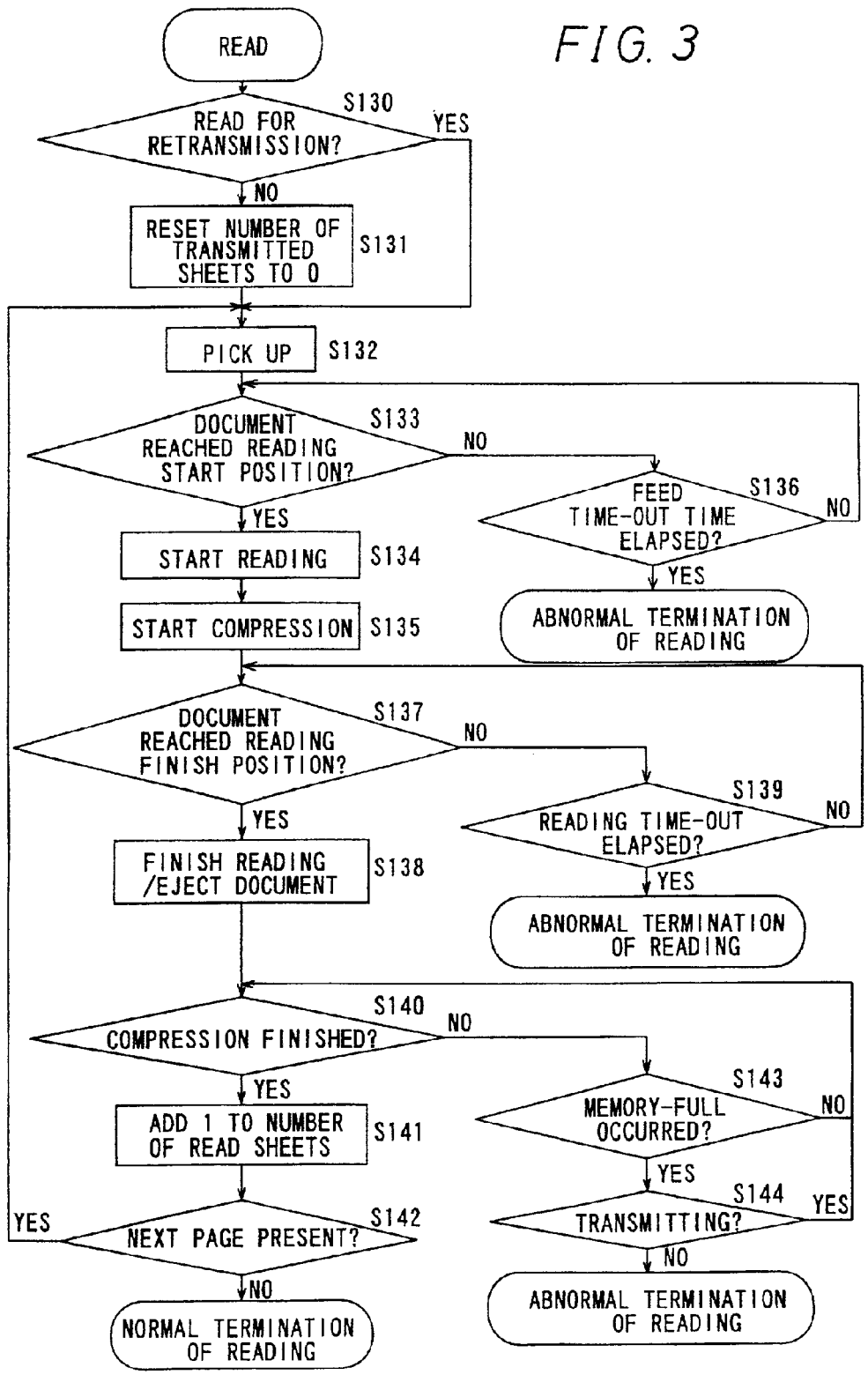
FIG. 3 is a flowchart relating to a first fax transmission process of the invention.
Figure 4A:
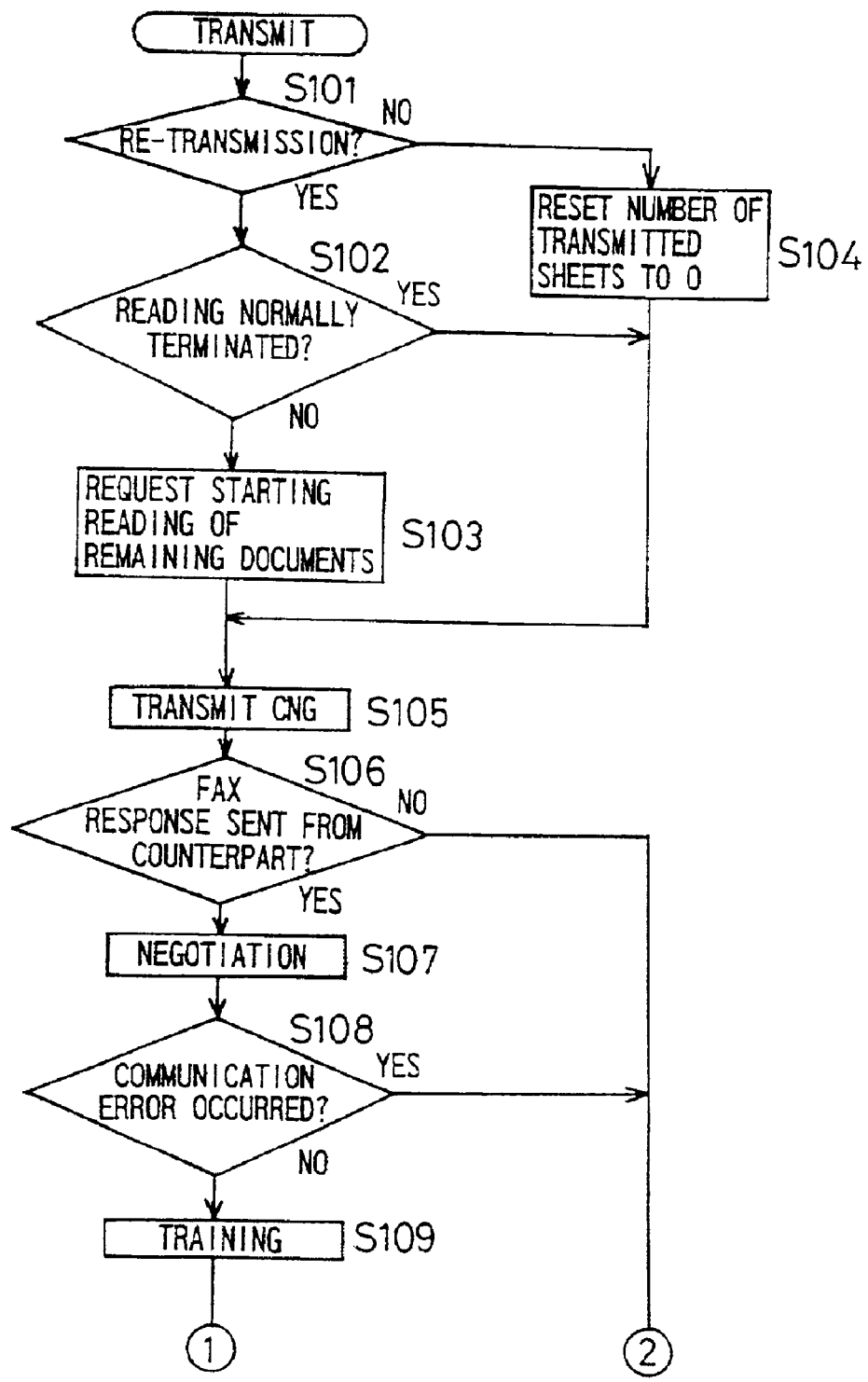
FIGS. 4A and 4B are a flowcharts relating to the first fax transmission process of the invention.
Figure 4B:
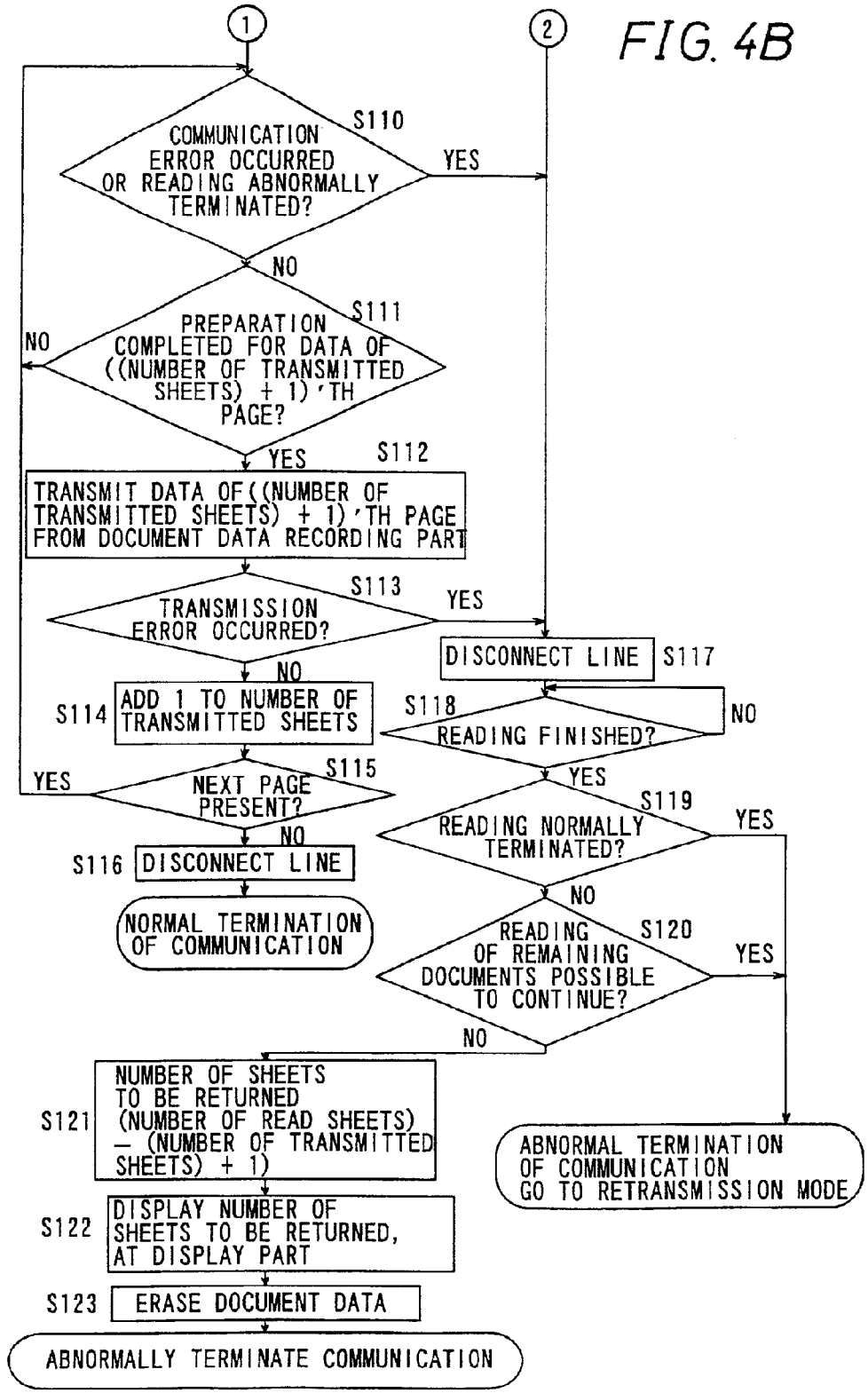

The following will describe a first transmission process according to the invention by a fax machine including retransmission processing with reference to flowcharts shown in FIGS. 3, 4A and 4B. According to a reading procedure shown in FIG. 3, after activation, first the process decides whether reading is for a first transmission or retransmission (step S130 in FIG. 3, which is hereinafter abbreviated as S130); and when it is judged as reading for the first transmission, the number of documents sheets for which image data are read (hereinafter described as read sheets) is reset to 0 (S131).

Next, the process picks up one sheet of a document (S132) and, when the document has reached a reading start position, the process starts reading (S133, S134). Image data read at the scanner part 31 are recorded in a scan buffer and compressed at the image compression/decompression part and then stored in a memory as data on the ((number of read sheets)+1)'th page (S135). When the document does not reach at the reading start position within a predetermined lapse of time, a document misfeeding error occurs, to abnormally terminate the reading procedure (S136).

When a document reaches the reading finish position during a reading operation, the process finishes reading in the document and ejects the document (S137, S138). When in this case the document does not reach the reading finish position within a predetermined lapse of time, the process recognize it as a document jam error and abnormally terminates the reading procedure (S139).

When reading is finished, the process decides whether image data has completely been compressed (S140). When the data is compressed and stored in a memory, the process adds 1 to the number of read sheets (S141) and, when there is present a next page, the process repeats processing starting from a pick-up operation (S132–S141) and, otherwise, normally terminates the reading procedure (S142).

When a memory-full event occurred in an image recording region during data are being compressed (S140), the process, when being engaged in transmission, can sequentially delete data which has been transmitted, so goes on with compression processing immediately after a free space of the memory is secured and, otherwise, is not sure whether it can release the memory, so stops compression processing and abnormally terminates the reading procedure (S143, S144).

In a transmission procedure shown in FIGS. 4A and 4B, the process decides whether transmission once started is a retransmission operation or not (S101) and, when it decides it is not retransmission, the process resets the number of documents sheets for which image data is transmitted (hereinafter described as transmitted sheets) (S104). When transmission is started from a stand-by state, it cannot be retransmission, so the processing of S101 through S104 is sure to reset the number of transmitted sheets.

Next, the process performs transmission of a CNG signal via modem parts 603c and NCU 603d on the fax board 603 and a known facsimile procedure such as negotiation or training (S105, S107, S109). When, in this case, there is given no response from a counterpart (called party) or a communication error, a violation in a facsimile procedure, or an abnormal termination in a reading procedure occurred, the process disconnects a line and performs error handling (S106, S108, S110, S117).

When operations up to the training have been normally terminated, the process waits until data of images to be transmitted are completely prepared (S111). When the data are prepared, the process transmits image data of the ((number of transmitted sheets)+1)'th page via the modem parts 603c and NCU603d (S112). When a communication trouble occurred during transmission of the image data, the process disconnects the line and performs error handling (S113, S117).

Then, when one page of data is completely transmitted, the process adds 1 to the number of transmitted sheets (S114) and decides whether there is present a next page to process (S115). When there is a next page to process, the process repeats processing starting from the image data transmission processing (S110) up to processing of deciding of presence of a next page (S115) and, otherwise, terminates the facsimile procedure and disconnects the line (S116). In this case, the facsimile apparatus returns into a stand-by state because the process has terminated normally.

When the line is disconnected (S117) by any one of various troubles during the processing of the transmission procedure (S117–S103), the following process is performed. First, according to a reading procedure shown in FIG. 3, when a reading operation is still going on, the process waits until the reading operation is finished irrespective of whether the reading operation is normal or abnormal (S118). When the reading operation is finished, when the reading operation is normally terminated or when although the reading operation is abnormally terminated, the remaining documents can be read again, the process enters a retransmission mode to activate a transmission procedure shown in FIGS. 4A and 4B immediately after retransmission conditions are satisfied (S119, S120).

When, after the reading operation is finished and abnormally terminated and also it is impossible to resume reading of the remaining documents, the process displays a note of ((number of read sheets)−(number of transmitted sheets)+1) as the number of returned sheets at the LCD-104 on the operation panel 103 and notifies the user of a number of sheets, of the ejected documents, which must be set again for retransmitted (S121, S122). In this case, the user is instructed, according to the thus displayed number of returned sheets, to reset documents as many sheets as the number of returned sheets counting back from the last document according to the reading procedure and retransmits the documents manually. Up to that point in time, a main memory may be used due to facsimile transmission or reception, the process erases image data on the memory and terminates the transmission (S123).

When the transmission procedure is activated again in the retransmission mode, the process decides whether transmission in question is retransmission or not (S101) and then decides whether reading of documents has been terminated normally (S102) and, in the case of normal termination, the process activates a reading procedure shown in FIG. 3 in order to read the remaining documents (S103). In this case, the reading operation is for retransmission in the reading procedure shown in FIG. 3, the process does not resets the number of read sheets (S130, S131) but reads in documents as continuation of data which has already been read and stored in a memory.

Operations starting from retransmission decision are performed must the same way as operations after resetting of the number of transmitted sheets at the time of first transmission (S104). As a result, documents which have already been read are transmitted from a memory, following which documents not read yet are read and sequentially transmitted.

Operations for a second fax transmission according to the invention including retransmission processing are described with reference to FIGS. 5A, 5B, 6A and 6B. FIG. 6A is essentially equivalent to FIG. 4A, with portions other than S218–S220 in FIG. 6B being equivalent to S110–S118 in FIG. 4B. Also, S236–S249 in FIGS. 5A and 5B are equivalent to S131–S144 in FIG. 3.

Figure 5A:
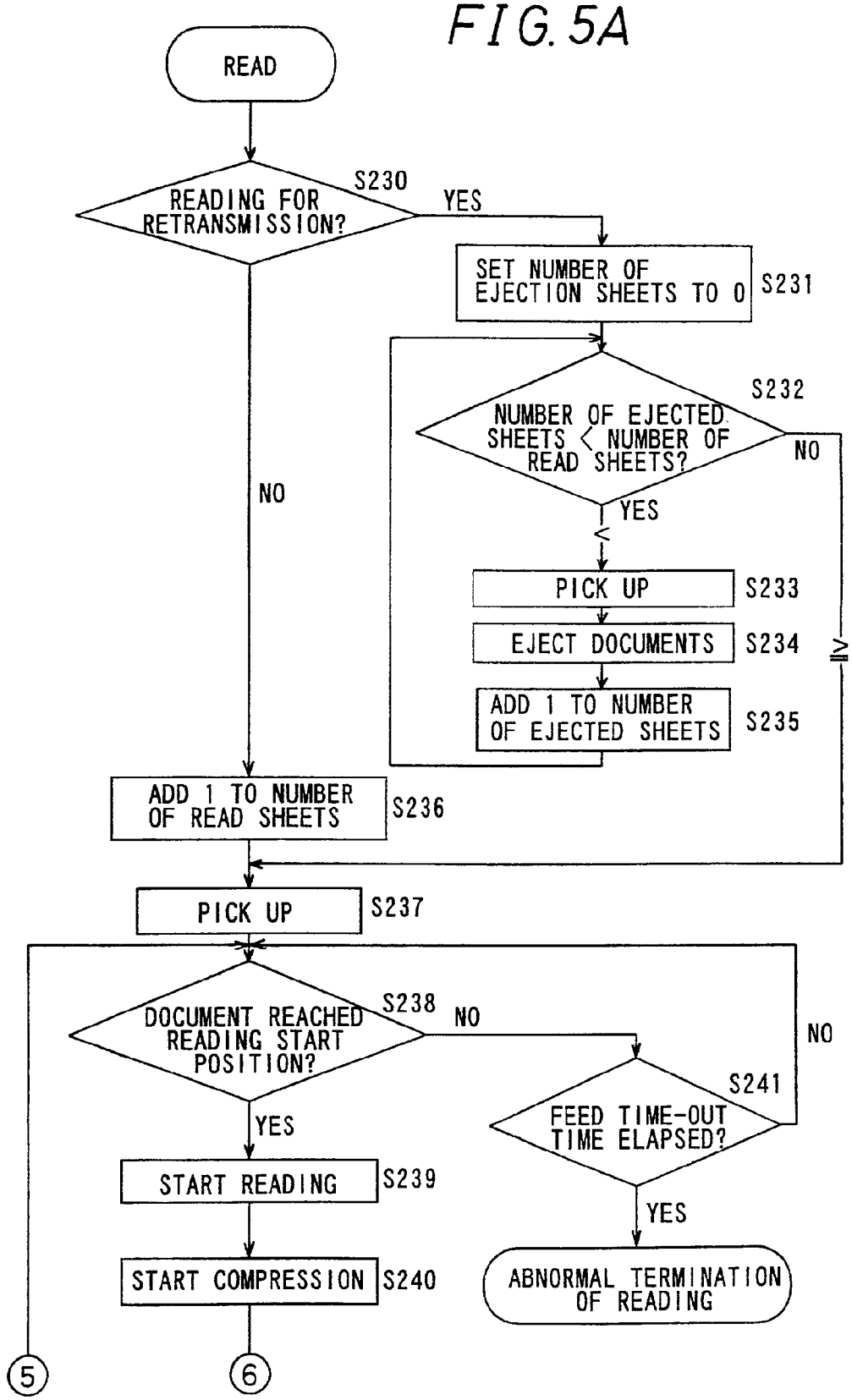
FIGS. 5A and 5B are a flowchart relating to a second fax transmission process of the invention.
Figure 5B:
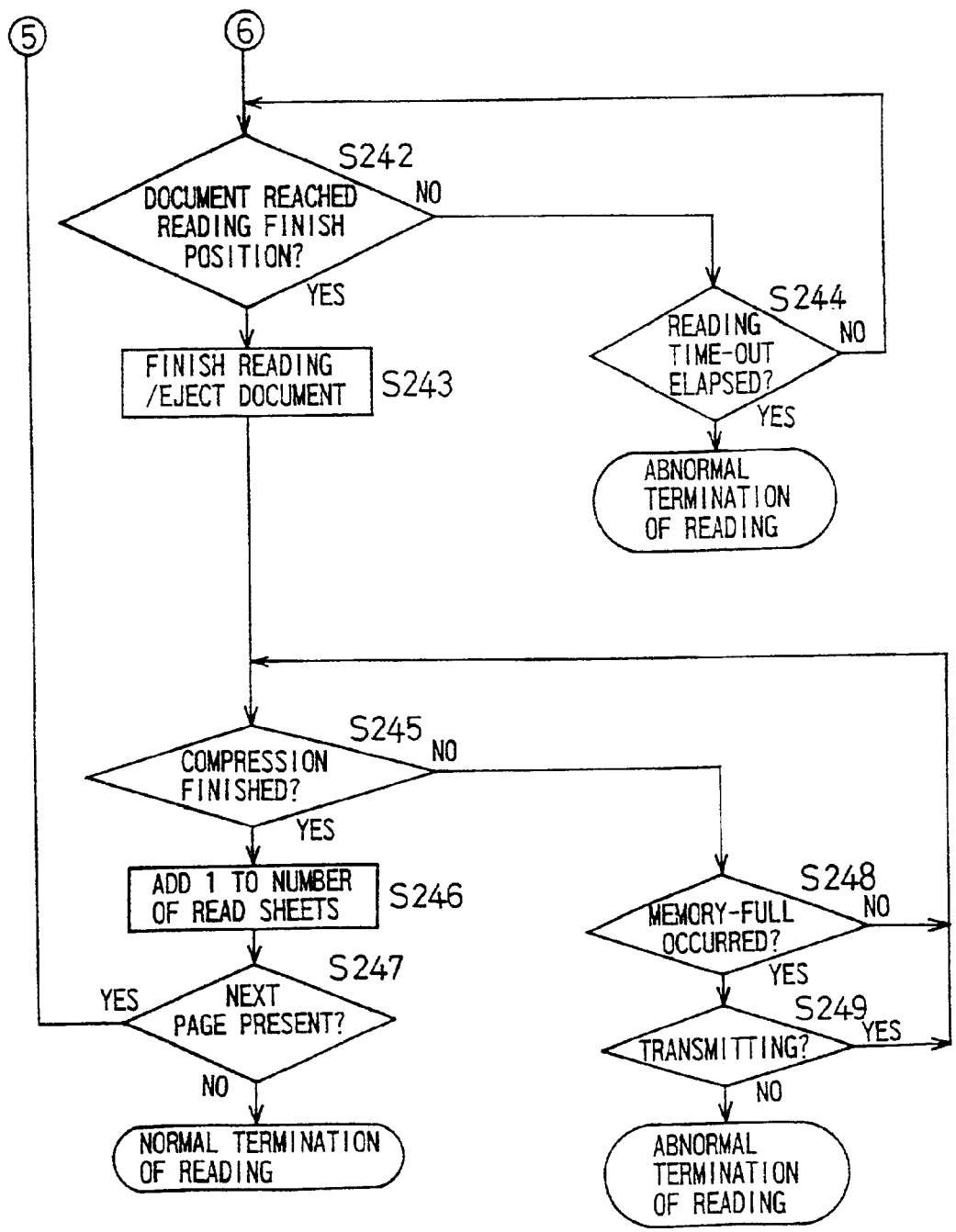
Figure 6A:
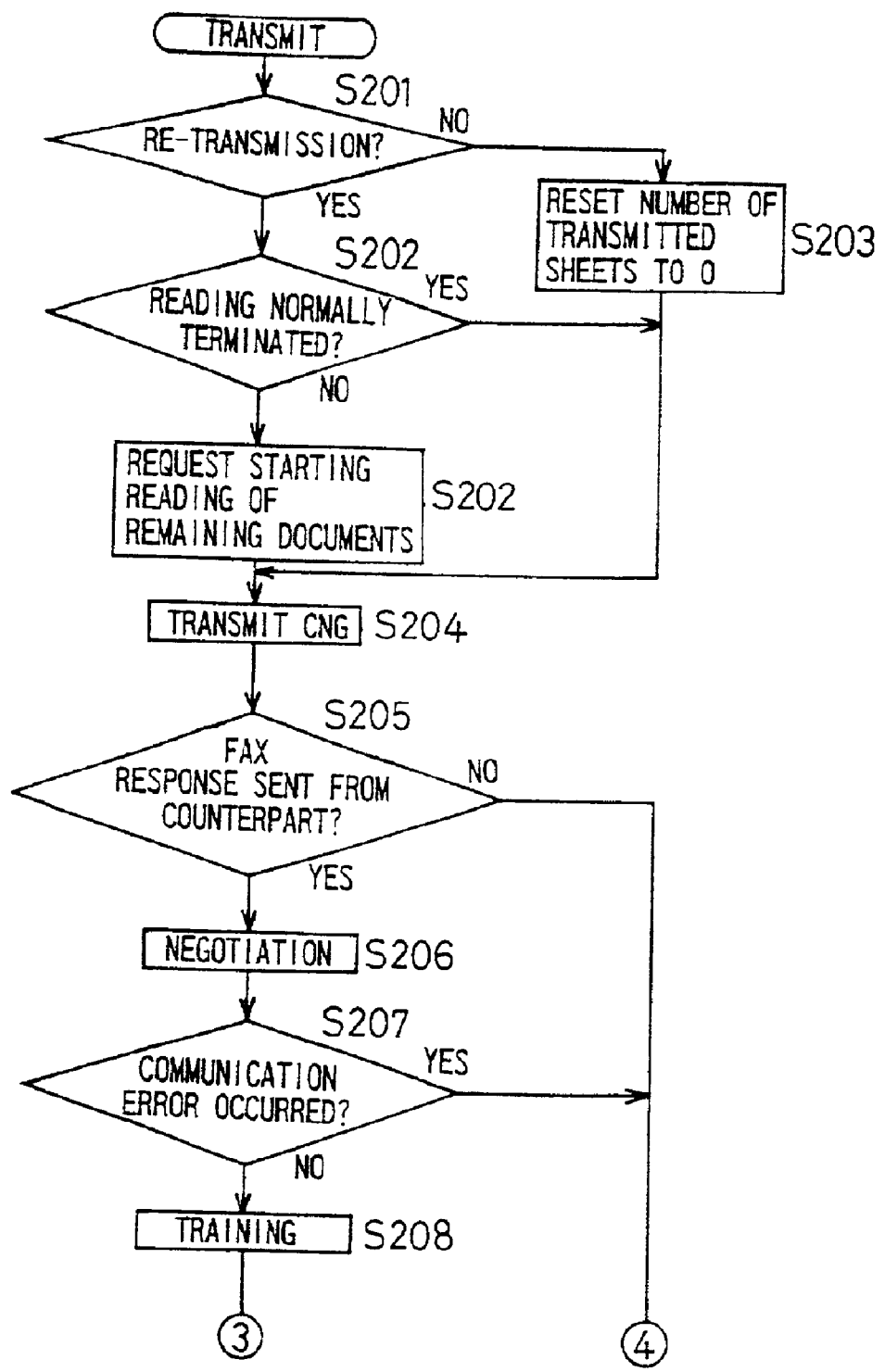
FIGS. 6A and 6B are still another flowchart relating to the second fax transmission process of the invention.

When a reading procedure shown in FIGS. 5A and 5B is activated, the process decides whether reading is for the first transmission or for retransmission (S230) and, in the case of the first transmission, the process resets the number of read sheets (S236) and, in the case of retransmission, picks up documents only as many as a number of read sheets and ejects the documents as they are without reading the documents in (S231–S235).

As for the documents after being ejected without being read, like in the case of the reading procedure for fax transmission processing, when a document mis-feed, document jamming, or memory-full not during transmission occurred, the process abnormally terminates the reading procedure and, otherwise, reads in all documents and records the documents in a memory (S237–S249).

Figure 6B:
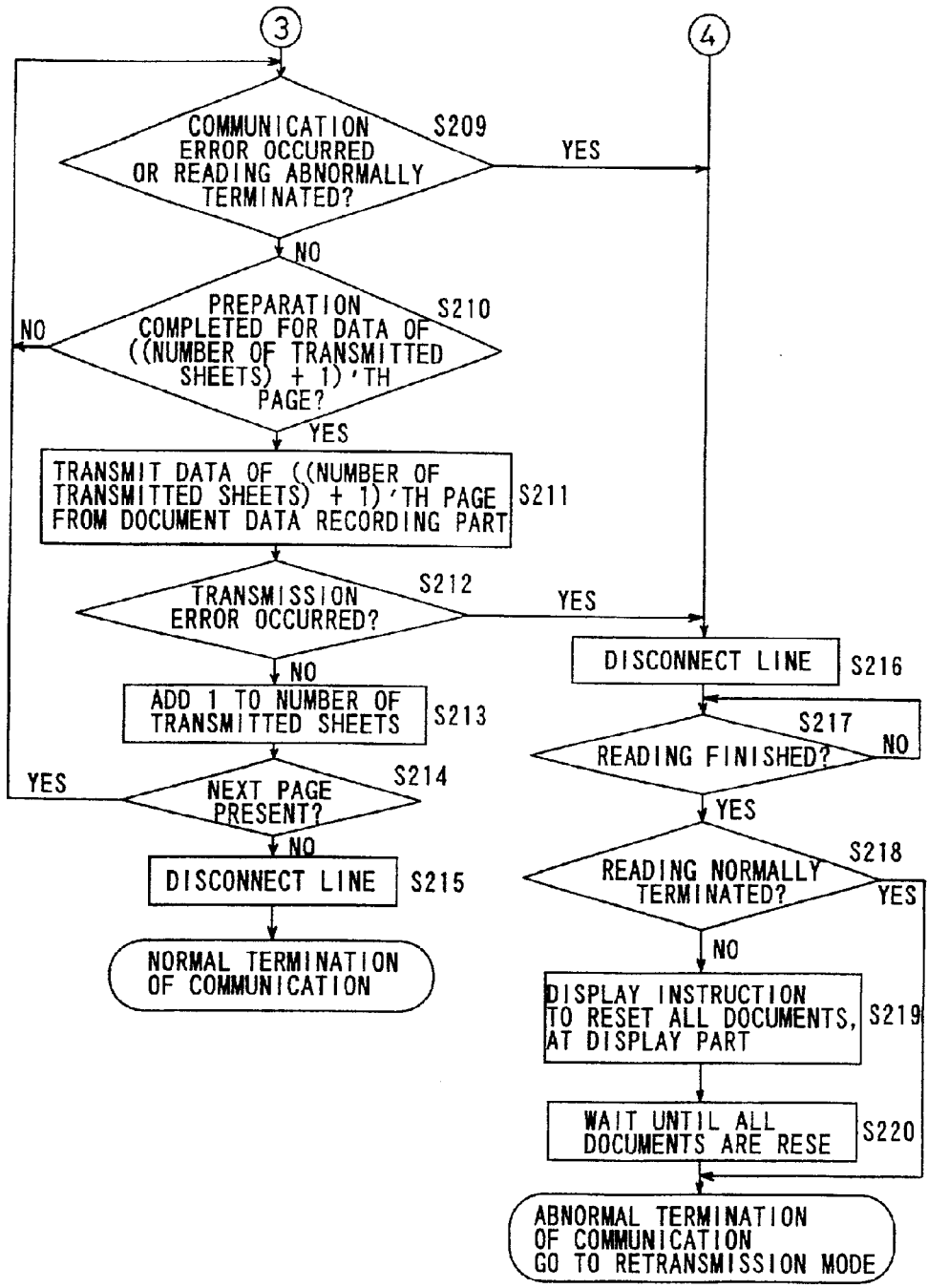

In a transmission procedure shown in FIGS. 6A and 6B, error handling performed upon line disconnection due to any one of various troubles (S218–S220) is different from that in a transmission procedure for fax transmission processing. After a line is disconnected (S216), when reading is going on according to a reading procedure shown in FIGS. 5A and 5B, first the process waits until reading is finished irrespective of whether the reading operation is normal or abnormal (S217). After reading is finished, the process decides whether the reading operation is normally terminated or not (S218) and, in the case of normal termination, enters a retransmission mode and activates a transmission procedure shown in FIGS. 6A and 6B immediately after the retransmission conditions are satisfied.

In the case of abnormal termination of the reading operation, the process displays at the LCD 104 on the operation panel 103 an instruction that the user should reset all documents (S219) and waits until the all documents are reset (S220). Immediately after the all documents are reset, the process enters a retransmission mode and, immediately after retransmission conditions are satisfied, activates a transmission procedure shown in FIGS. 6A and 6B again.

In the case of abnormal termination of the reading operation, the process displays at the LCD104 on the operation panel 103 an instruction that the user should reset all documents (S219) and waits until the all documents are reset (S220). Immediately after the all documents are reset, the process enters a retransmission mode and, immediately after retransmission conditions are satisfied, activates a transmission procedure shown in FIGS. 6A and 6B again.

When the transmission procedure is activated in the retransmission mode, the process first decides whether reading is terminated normally or not (S201) and, in the case of normal termination, activates a reading procedure shown in FIGS. 5A and 5B to read remaining documents (S202). Since, in this case, reading in question is for retransmission in the reading procedure shown in FIGS. 5A and 5B, documents which have already been read are automatically ejected (S230–S235) and, moreover since the number of read sheets is not reset, remaining documents are read as data following data which is already read and recorded in a memory.

Operations after documents are ejected as many as a number of read sheets are almost the same as operations after the number of transmitted sheets is reset at a first transmission (S236). As a result, documents already read are transmitted from an image memory, following which documents not read yet are read and sequentially transmitted.

In the case of retransmission, to decide whether documents in question are not read yet or already read, the process may compare data read by scanning a predetermined region of the document to data stored at a corresponding portion in an image memory. In this case, in order to decide for complete agreement, it is necessary to compare data of all the documents read to the corresponding data, in which method, however, no effects can be expected to reduce reading processing in size, so that the process may well scan, for comparison, for example only portions with page numbers of documents or a certain region characteristic of documents.

Figure 8A:
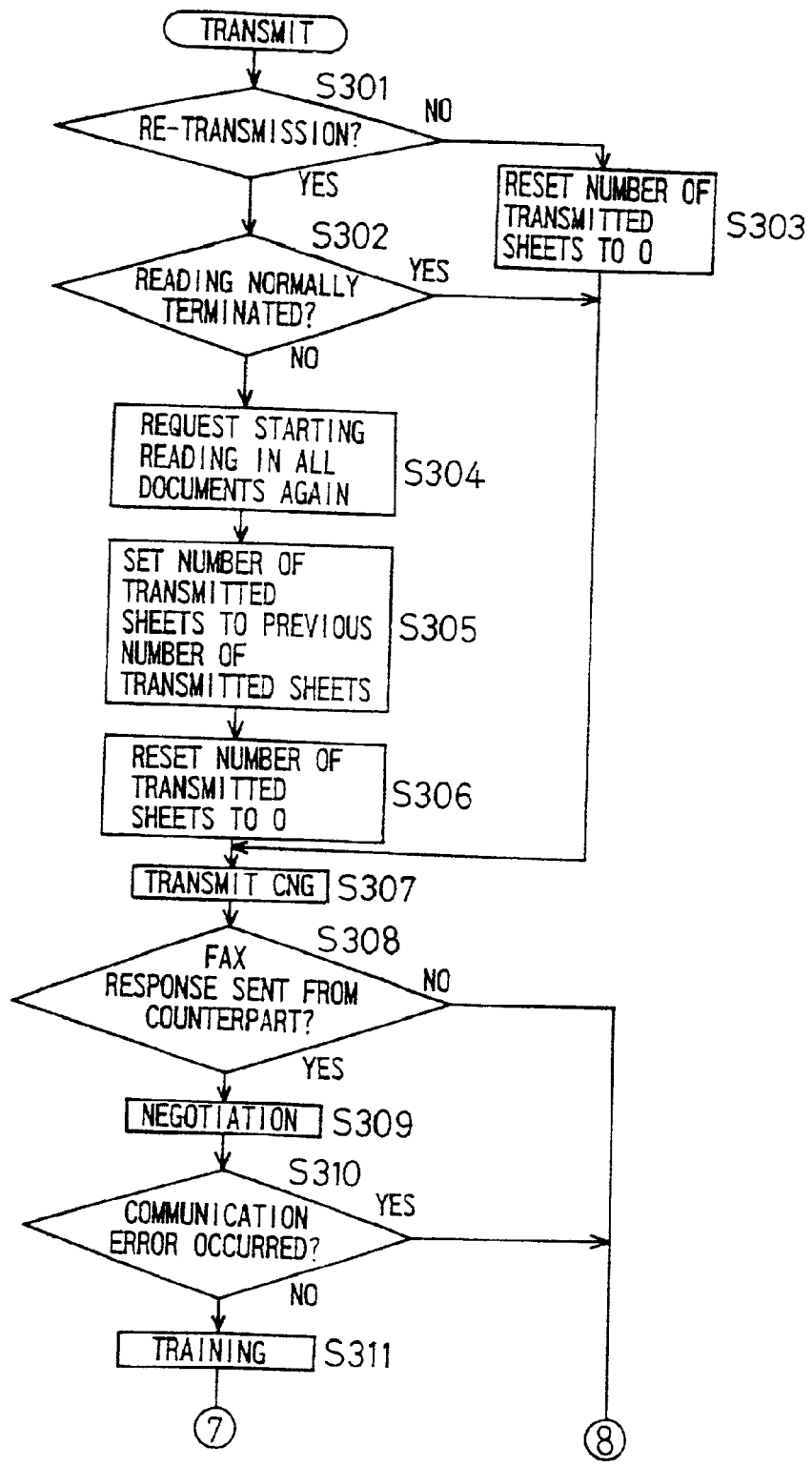
FIGS. 8A and 8B are another flowchart relating to the third fax transmission process of the invention.

The third fax transmission processing including retransmission processing is described with reference to FIGS. 7, 8A and 8B. Of a processing flow for a third fax transmission, FIG. 8A is the same as FIG. 4A except for S305 and S306 and also the same as FIG. 4B except for S314–S317, S320, S321, and S325–S327. Also, FIG. 5B is the same as FIG. 3 except for S130.

In a reading procedure shown in FIG. 7, the process surely resets the number of read sheets irrespective of whether a first transmission upon activation is for retransmission or not (S330). In processing after resetting (S331–S343), like in the case of processing after the number of read sheets is reset according to a reading procedure for first fax transmission processing (S132–S144), when a document mis-feed, document jamming, or memory-full error not during transmission occurred, the process abnormally terminates the reading procedure and, otherwise, reads in all documents and records the documents in a memory.

Figure 8B:
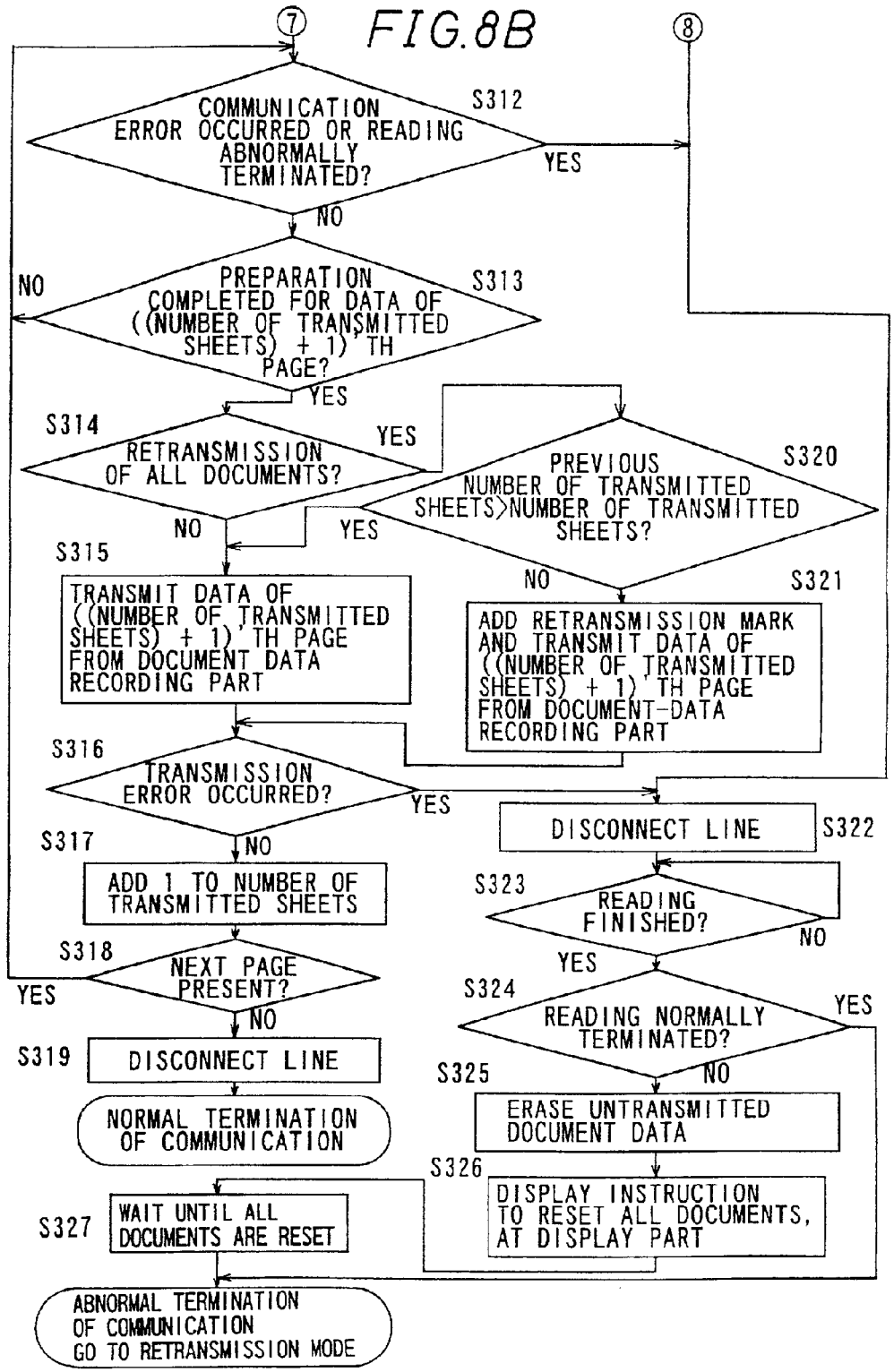

In a transmission procedure shown in FIGS. 8A and 8B, the process decides whether the transmission upon activation is retransmission or not (S301) and, in the case of not retransmission, the process resets the number of transmitted sheets (S303). In the case where transmission is started normally, which does not means retransmission, the process surely resets the number of transmitted sheets. At the time of a first transmission, the process performs the same processing as processing after the number of transmitted sheets is reset according to a transmission procedure for first fax transmission except for error handling for trouble occurrence after resetting (from S323) (S307–S319).

When a line is disconnected due to any one of various troubles (S322), the following processing is performed. After the line is disconnected, when reading is going on according to a reading procedure shown in FIG. 7, the process waits irrespective of whether the reading operation is normal or abnormal (S323). When the reading operation is finished, the process decides whether the reading operation is terminated normally (S324) and, in the case of normal termination, enters a retransmission mode and activates a transmission procedure shown in FIGS. 8A and BB immediately after the retransmission conditions are satisfied.

In the case of abnormal termination of the reading operation, the process displays at the LCD104 on the operation panel 103 an instruction that the user should reset all documents (S326) and waits until the all documents are reset (S327). At this point in time, the process once erases data of documents not transmitted from a memory (S325) and, when documents are reset, enters a retransmission mode and activates the transmission procedure shown in FIGS. 8A and BB immediately after the retransmission conditions are satisfied.

When the transmission procedure is activated again in the retransmission mode, after decision for retransmission (S301), the process decides whether reading is normally terminated or not (S302) and, in the case of abnormal termination, activates a reading procedure shown in FIG. 7 in order to read all documents again (S304). At this time, according to the reading procedure shown in FIG. 7, the process reads in documents starting from a first page regardless of the number of transmitted sheets. Then, the process saves the number of transmitted sheets as the previous number of transmitted sheets and resets the number of transmitted sheets (S305, S306). Note here that for CNG transmission, negotiation, and training, the same processing is performed as the transmission procedure for a first fax transmission processing (S307–S313).

Then, in transmission of image data, the process transmits from a memory the image data of documents starting from the (number of transmitted sheets+1)'th page. That is, when a previous reading operation is finished normally, the process transmits data starting from a page following the last transmitted page and, in the case of abnormal termination, transmits the data starting from a first page.

Therefore, when preparation is completed for image data of the (number of transmitted sheets+1)'th page, the process decides whether the previous reading operation is abnormally terminated (S314) and, in the case of abnormal termination, i.e. in the case of retransmission of all documents, the process compares (previous number of transmitted sheets) with (number of transmitted sheets) (S320) and, when (previous number of transmitted sheets)>(number of transmitted sheets), the process adds data indicating retransmission to document image data and transmits the image data (S321). In the case of normal termination, the process transmits the document image data as it is (S315).

Figure 9A:
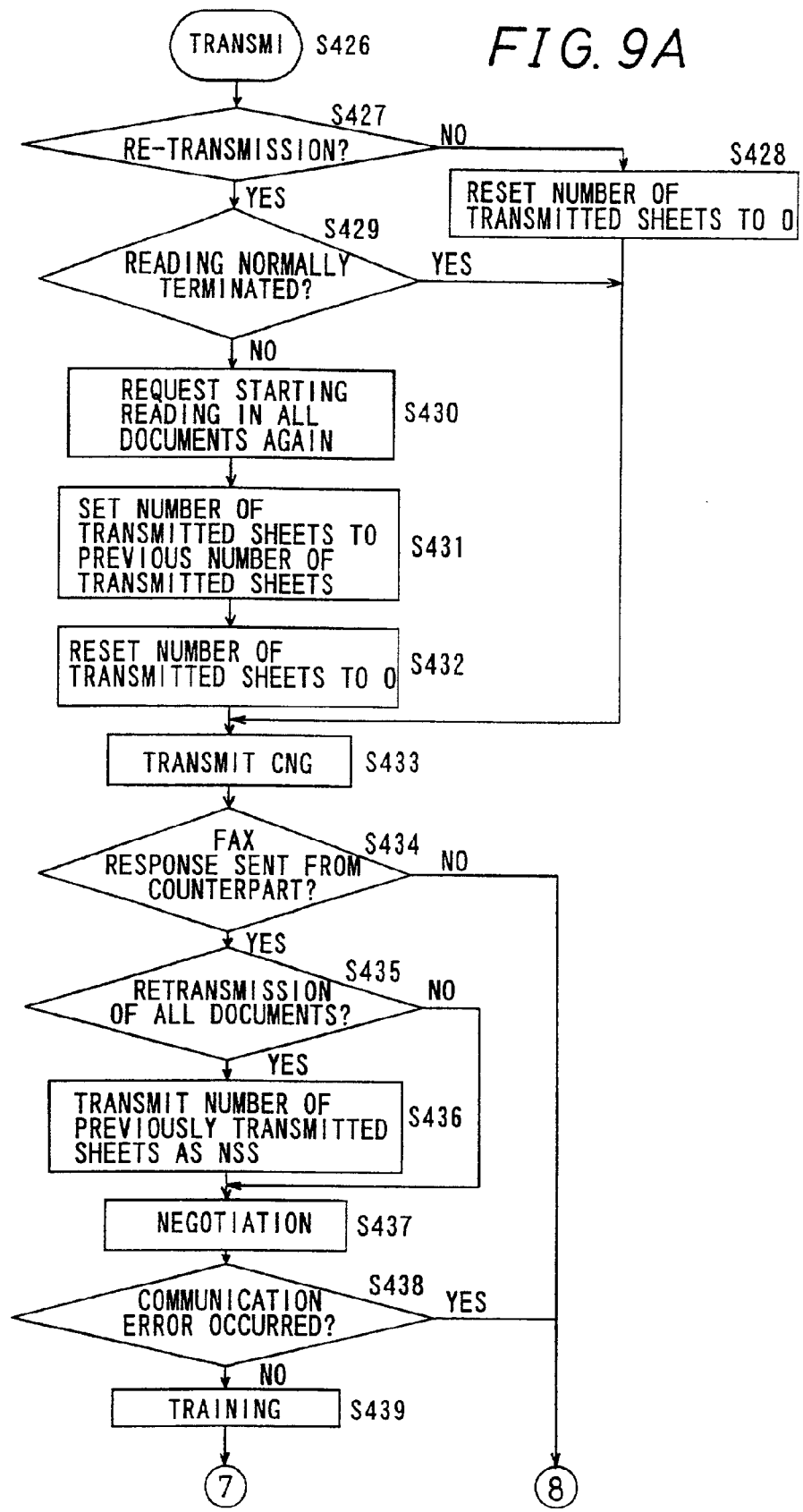

FIGS. 9A and 9B show flowchart for a transmission procedure for a fourth fax transmission processing including retransmission processing, while FIG. 10 is a flowchart for a first fax reception processing in response to the fax transmission processing shown in FIGS. 9A and 9B. Of a processing flow shown in FIGS. 9A, 9B, 10 and 11, FIG. 9A is the same as FIG. 8A except that S435 and S436 are added, while FIG. 9B is the same as FIG. 6B except for S320 and S321.

In a transmission procedure shown in FIGS. 9A and 9B, the process performs the following processing immediately before step processing (S309) for performing negotiation shown in FIG. 8A relating to fax transmission processing. That is, much the same way as S314 shown in FIGS. 8A and 8B, the process decides whether a previous reading operation is abnormally terminated or not (S435).

When results of decision indicate abnormal termination, that is in the case of retransmitting all documents (in the case of YES at S435), the process transmits a value of (previous number of transmitted sheets) as a signal NSS for a non-standard procedure to a reception side. When, for example, the previous number of transmitted sheets is five, a value of "5" is transmitted.

By thus performing processing, the process need not perform processing, at S321 shown in FIGS. 8A and 8B, of "adding a retransmission mark, to transmit data of ((number of transmitted sheets)+1)'th page from a document data recording part," thus, as mentioned earlier, omitting processing corresponding to S314, S320, and S321 shown in FIGS. 8A and 8B after preparation is completed in FIGS. 9A and 9B for data of the ((number of transmitted sheets)+1)'th page.

The following will describe operations for a first fax reception processing with reference to a flowchart shown in FIG. 10. First, when an apparatus stayed in a reception-waiting state (S401) on the side of reception receives a CNG signal (S402), the apparatus transmits a response signal to an apparatus on the transmission side (S403), and the reception side receives as an NSS signal a value of a previous number of transmitted sheets (S404) and performs training (S405) and then receives image data (S406).

In reception of image data, the process decides whether a currently receiving number of pages is not larger than a value of a previous number of transmitted sheets based on a previous number of transmitted sheets received at S404 (S407). When the number of pages is not larger than the value of the previous number of transmitted sheets (in the case of YES at S407), which means that the received image data is of the previously transmitted image, the process adds data indicating retransmission to the received image data (S408) and outputs images based on image data obtained after the addition (S409). That is, when for example the previous number of transmitted sheets is five, the process adds image data indicating retransmission to the first through fifth pages of received image data.

When the currently received number of pages is larger than a value of the previous number of transmitted sheets (in the case of NO at S407), the process outputs images as they are, based on the received image data (S409). After the images are outputted, the process checks for the presence of a following page. When there is present a following page (in the case of YES at S410), the process returns to S406 again to repeat processing of S406 through S410. When there is no following page present (in the case of NO at S410), the process disconnects a line (S411) and terminates communication (S412). Thus, the process can prevent image data determined by an apparatus on the transmission side from being added to document image data, to add an arbitrary message to an arbitrary position of document image data at an apparatus on the reception side.

Figure 11:
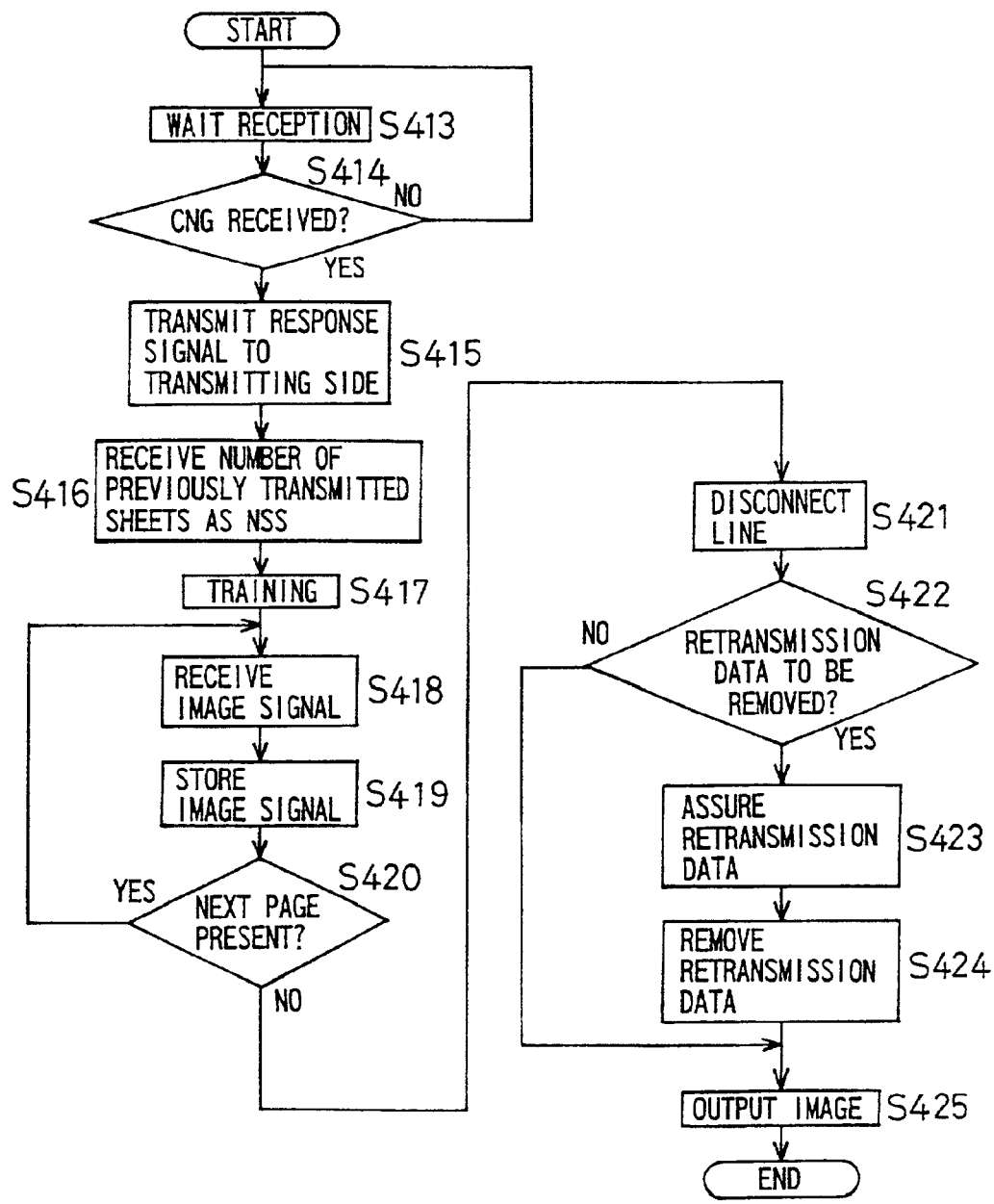
FIG. 11 is another flowchart relating to the second fax transmission process of the invention.

FIG. 11 shows a flowchart for a second fax reception processing to respond to a fourth fax transmission processing shown in FIGS. 9A and 9B. Processing shown in FIG. 11 is performed when a reception-side apparatus is ready for memory-reception. FIG. 11 is different from FIG. 10 in processing of S417 and subsequent. That is, after training at S417, the process receives document image data while once storing the received image data as far as there is given a following page (S418–S420).

Then, after a line is disconnected (S421), the process displays decision of whether retransmitted data is to be removed or not in such a manner as instructed by the user that the user can recognize the decision. When the data is to be removed (in the case of YES at S422), the process assures retransmission data of thus received all image data (S423), removes the retransmission data (S424), and outputs images based only on the remaining image data. When the retransmission data is not to be removed (in the case of NO at S422), the process outputs images using the received all image data as it is.

By behaving in such a way, when a reception-side apparatus is of such a type as capable of memory-reception, the process can receive as an NSS signal a value of the previous number of transmitted sheets and then store all retransmission image data and, after transmission, delete data, of the stored image data, for previous transmission (e.g., data of pages 1 through 5) in response to a request from a reception-side user based on a value of the previous number of transmitted sheets to prevent the data from being outputted.

Therefore, it is possible to output recording paper of retransmission image data in response to a request from a reception-side user, to output retransmission portions only as required, thus avoiding waste use of recording paper. Note here that fax reception processing shown in FIGS. 10 and 11 can of course be accommodated only when a reception-side apparatus has received the previous number of transmitted sheets as an NSS signal.

Although the invention has been described as above, of course the invention is not limited to the above embodiments. For example, although the above embodiments are exemplified in a case where facsimile functions are provided to a digital image forming apparatus, in place of the digital image forming apparatus, the embodiments may be applied to a case where a facsimile apparatus is used independently or facsimile functions are provided to a multi-function printer etc.

Also, an image data transmitting apparatus or image data transmission system may be a facsimile apparatus or any other transmitting apparatus provided with transmission functions connected with so-called a telephone line. For example, the invention may be taken to be a system and applied to such a configuration of system (electronic file system etc.) that the image reading part is comprised of an external scanner, the storage part is comprised of a memory of a personal computer or other data processing apparatus, the image recording part is comprised of an image forming apparatus such as a printer which shares a network, and the communication means is comprised of a network interface (network adapter) etc., thus providing beforehand a program for performing processing relating to FIGS. 3–11. Note here that the configuration may be provided integrally or separately entirely or partly by providing the scanner or the image forming part separately.

Moreover, the control part of the configuration according to the invention (FIGS. 3–11) may of course be configured entirely or partially by software recorded in a recording medium capable of reading by hardware or a data processing apparatus.

As mentioned above, one feature of the invention is that an image data transmitting apparatus according to the invention comprises: document reading means for reading in documents that are set; image data storing means for storing image data of documents which are read; communication means connected via a communication line; and trouble detecting means for detecting a transmission trouble which occurred during transmission, by the communication means, of image data of documents which are read by the document reading means, in such a configuration that when a transmission trouble is detected by the trouble detecting means, the apparatus stops both reception by the document reading means and transmission by the communication means and then, when documents are set to the document reading means, resumes both reception by the document reading means and transmission by the communication means, in which the apparatus further comprises number-of-transmitted sheets storing means for storing the number of document sheets for which image data has been completely read by the communication means by a time when transmission is stopped due to a transmission trouble and read-sheets-number storing means for storing the number of document sheets for which image data has been completely read by the document reading means and is stored in the image data storing means. When the read-sheets-number storing means is provided, even when a transmission trouble occurred with the image data transmitting apparatus and transmission is stopped, it is possible to discriminate between documents completely read and documents whose image data is completely transmitted in appropriate management, thus enabling secure retransmission effectively depending on a situation.

In the image data transmitting apparatus according to the invention, it is possible to transmit documents yet to be transmitted based on data from both the transmitted-sheets-number storing means and the image data storing means, and read documents yet to be read, based on data from the read-sheets-number storing means for retransmission. With this, it is unnecessary to read the same document again which has already been read, to read only required minimum quantities of documents, thus reducing a retransmission time and a document restraint time. Also it is unnecessary for a user to confirm documents with a transmission error and discriminate between necessary and unnecessary documents before retransmission, thus improving operability.

Another feature of the invention is that when a transmission trouble occurred with the image data transmitting apparatus to stop transmission so as to set a document at the document reading means for retransmission, it is possible to read only documents not read yet of all documents set to the document reading means without reading in documents already read, based on the read-sheets-number stored in the read-sheets-number storing means. With this, it is unnecessary to discriminate documents by deciding whether the documents are already transmitted or read, so that the apparatus can automatically extract documents and process the documents, thus enabling to improve operability and to surely retransmit data as occasion demands to reduce the time required for releasing of documents.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image data transmitting apparatus comprising:

document reading means for reading a document set therein;

image data storing means for storing the image data of the document resulting from reading;

communication means connected to an image data receiving apparatus via a communication line; and trouble detecting means for detecting a transmission trouble which has occurred in transmitting the image data by the communication means, wherein when the trouble detecting means detects the transmission trouble, a reading operation of the document reading means and a transmission operation of the communication means are stopped, and when the documents are set in the document reading means thereafter again, the reading operation of the document reading means and the transmission operation of the communication means are restarted, the image data transmitting apparatus further comprising:

transmitted-sheets-number storing means for storing a number of document sheets for which image data is completely transmitted by the communication means by a time when the interruption of transmission is carried out by reason of occurrence of the transmission trouble, wherein in retransmitting image data for all the documents, discrimination data is added to the image data for the documents to discriminate between image data which is already transmitted and image data which is not transmitted yet, based on the data stored in the transmitted-sheets-number storing means.

2. The image data transmitting apparatus of claim 1, further comprising:

read-sheets-number storing means for storing a number of document sheets for which image data resulting from reading by the document reading means is stored in the image data storing means; and notification means for notifying a user of a number of document sheets to be reset in the document reading means for retransmission, based on the data stored in the transmitted-sheets-number storing means or the read-sheets-number storing means, wherein for the documents reset in the document reading means reading is carried out again and resulting image data is retransmitted.

3. The image data transmitting apparatus of claim 2, wherein in retransmission of the documents reset in the document reading means after the interruption of the transmission operation because of a transmission trouble, image data which is read for predetermined part of each of the reset documents by the document reading means is compared to image data for corresponding part of each document previously read and stored in the image data storing means, and when the image data matches, reading of an entirety of the relevant reset document is not carried out, and when the image data does not match, reading for the entirety of the relevant reset document is carried out.

4. An image data receiving apparatus comprising:

communication means connected an image data transmitting apparatus via a communication line;

image data storing means for storing image data of transmission data received via the communication line;

controlling/printing means for controlling and printing image data stored in the image data storing means; and discrimination-data detecting means for detecting discrimination-data for discriminating between image data previously not transmitted and image data previously transmitted has been transmitted from the image data transmitting apparatus, wherein the controlling/printing means controls printing operation of image data previously not transmitted and printing operation of image data previously transmitted, based on a result of detection by the discrimination-data detection means; to be different from each other.

5. The image data receiving apparatus of claim 4, wherein the printing operation of the image data previously transmitted is different from that of image data previously not transmitted, in that an image to an effect that transmission has already been completed is printed in printing the image data previously transmitted.

6. The image data receiving apparatus of claim 4, wherein the printing operation of the image data previously transmitted is different from that of image data previously not transmitted, in that when image data previously transmitted is received, image data which corresponds to the received image data and is previously received and stored in the image data storing means, is selectively erased.

* * * * *